US012724924B2

(12) United States Patent
Chiou et al.

(10) Patent No.: US 12,724,924 B2
(45) Date of Patent: Sep. 1, 2026

(54) COMPUTING CIRCUIT AND DATA COMPUTING METHOD

(71) Applicant: Industrial Technology Research Institute, Hsinchu (TW)

(72) Inventors: Bo-Cheng Chiou, Hsinchu County (TW); Chih-Sheng Lin, Hsinchu County (TW); Tuo-Hung Hou, Hsinchu City (TW); Chih-Ming Lai, New Taipei City (TW); Yun-Ting Ho, Kaohsiung City (TW); Shan-Ming Chang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 23 days.

(21) Appl. No.: 18/896,914

(22) Filed: Sep. 26, 2024

(65) Prior Publication Data

US 2025/0103751 A1 Mar. 27, 2025

Related U.S. Application Data

(60) Provisional application No. 63/585,602, filed on Sep. 27, 2023.

(51) Int. Cl.
*G06F 21/62* (2013.01)
*G06F 21/72* (2013.01)
*H04L 9/32* (2006.01)

(52) U.S. Cl.
CPC .......... *G06F 21/6254* (2013.01); *G06F 21/72* (2013.01); *H04L 9/3278* (2013.01)

(58) Field of Classification Search
CPC .... G06F 21/6254; G06F 21/72; H06F 9/3278; H06F 9/0866
See application file for complete search history.

(56) References Cited

U.S. PATENT DOCUMENTS 7,333,778 B2 2/2008 Pehlke et al.
9,536,581 B2 * 1/2017 Katoh ................ G11C 13/0059
(Continued)

FOREIGN PATENT DOCUMENTS

CN 107624188 1/2018
TW 202309763 A 3/2023
(Continued)

OTHER PUBLICATIONS

"Office Action of Taiwan counterpart Application", issued on Oct. 3, 2025, p. 1-p. 8.

(Continued)

*Primary Examiner* — Carl G Colin
*Assistant Examiner* — Andrew Suh
(74) *Attorney, Agent, or Firm* — JCIPRNET

(57) ABSTRACT

A computing circuit with a de-identified architecture, a data computing method, a data processing system, and a data de-identification method are provided. The computing circuit includes an arithmetic array and a de-identification circuit. The computing circuit may perform an accumulation operation on input data to generate accumulated data by the arithmetic array. The de-identification circuit has an analog offset error determined based on an analog physical unclonable function. The computing circuit may operate the accumulated data according to the analog offset error to generate de-identification data by the de-identification circuit. It can not only provide the analog offset error through the transistors in the de-identification circuit, but also be combined with obfuscated code settings to dynamically adjusting the degree of de-identification of data.

22 Claims, 26 Drawing Sheets

(56) References Cited

U.S. PATENT DOCUMENTS

| | | | | |
|---|---|---|---|---|
| 9,548,113 | B2 * | 1/2017 | Yoshimoto | G11C 13/0069 |
| 9,847,974 | B2 | 12/2017 | Kompalli | |
| 10,341,857 | B2 | 7/2019 | Rui et al. | |
| 11,139,958 | B2 | 10/2021 | Smith et al. | |
| 11,179,064 | B2 | 11/2021 | Ng et al. | |
| 2013/0051552 | A1 | 2/2013 | Handschuh et al. | |
| 2016/0148664 | A1 * | 5/2016 | Katoh | H04L 9/0866 365/148 |
| 2016/0266175 | A1 | 9/2016 | Nizza et al. | |
| 2019/0147188 | A1 | 5/2019 | Benaloh et al. | |
| 2020/0192971 | A1 | 6/2020 | Lue et al. | |
| 2021/0020041 | A1 | 1/2021 | Yang et al. | |
| 2021/0049282 | A1 * | 2/2021 | Di Valentino | G06F 21/6254 |
| 2021/0312077 | A1 | 10/2021 | Jain et al. | |
| 2023/0216838 | A1 | 7/2023 | Plusquellic et al. | |

FOREIGN PATENT DOCUMENTS

| | | |
|---|---|---|
| TW | 202312058 A | 3/2023 |
| TW | I824927 | 12/2023 |

OTHER PUBLICATIONS

Meng Chen et al., “VoiceCloak: Adversarial Example Enabled Voice De-Identification with Balanced Privacy and Utility”, Proc. ACM Interact. Mob. Wearable Ubiquitous Technol., Jun. 2023, pp. 1-21.

Jianqi Liu et al., “Enhanced Embedded AutoEncoders: An Attribute-Preserving Face De-Identification Framework”, IEEE Internet of Things Journal, vol. 10, No. 11, Jun. 1, 2023, pp. 9438-9452.

Yunlong Mao et al., “A Privacy-Preserving Deep Learning Approach for Face Recognition with Edge Computing”, USENIX Workshop on Hot Topics in Edge Computing, 2018, pp. 1-6.

Jingyan Fu et al., “Memristor-Based Neuromorphic Hardware Improvement for Privacy-Preserving Ann”, IEEE Transactions on Very Large Scale Integration (VLSI) Systems, vol. 27, No. 12, Dec. 2019, pp. 2745-2754.

Weizhe Hua et al., “GuardNN: Secure Accelerator Architecture for Privacy-Preserving Deep Learning”, arXiv:2008.11632v2 [cs.CR], May 25, 2022, pp. 1-7.

* cited by examiner

300'

COMPUTING CIRCUIT AND DATA COMPUTING METHOD

CROSS-REFERENCE TO RELATED APPLICATION

This application claims the priority benefit of U.S. provisional application Ser. No. 63/585,602, filed on Sep. 27, 2023. The entirety of the above-mentioned patent application is hereby incorporated by reference herein and made a part of this specification.

TECHNICAL FIELD

The disclosure relates to a computing circuit with a de-identified architecture, a data computing method, a data processing system, and a data de-identification method.

BACKGROUND

The traditional privacy protection manner mainly manages relevant privacy protection through a data collection center. However, the traditional privacy protection manner cannot guarantee the security of personal data or important data. Moreover, during a data transfer process, there may often be security risks of information leakage. In this regard, how to increase the privacy protection of the data collection center or a terminal apparatus has become particularly important.

SUMMARY

The disclosure provides a computing circuit with a de-identified architecture, a data computing method, a data processing system, and a data de-identification method, which perform computation in memory through an analog physical unclonable function (PUF), use an existing and unpredictable sensing drift error in the computing circuit itself, and apply the error to implement de-identification of data.

A computing circuit with a de-identified architecture of the disclosure includes an arithmetic array and a de-identification circuit. The arithmetic array performs an accumulation operation on input data to generate accumulated data. The de-identification circuit is coupled to the arithmetic array and has an analog offset error determined based on an analog physical unclonable function. The de-identification circuit operates the accumulated data according to the analog offset error to generate de-identification data.

A de-identification data computing method of the disclosure includes the following steps. An accumulation operation is performed on input data through an arithmetic array to generate accumulated data. The accumulated data is operated according to an analog offset error through a de-identification circuit to generate de-identification data. The analog offset error is determined based on an analog physical unclonable function of the de-identification circuit.

A data processing system of the disclosure includes a processing unit, an input unit, and a computing circuit. The input unit obtains input data. The computing circuit is coupled to the input unit. The computing circuit includes an arithmetic array and a de-identification circuit. The arithmetic array performs an accumulation operation on the input data to generate accumulated data. The de-identification circuit is coupled to the arithmetic array and has an analog offset error determined based on an analog physical unclonable function. The de-identification circuit operates the accumulated data according to the analog offset error to generate de-identification data, and outputs the de-identification data to the processing unit.

A data de-identification method of the disclosure includes the following steps. Input data is obtained through an input unit. An accumulation operation is performed on the input data through an arithmetic array to generate accumulated data. The accumulated data is operated according to an analog offset error through a de-identification circuit to generate de-identification data. The analog offset error is determined based on an analog physical unclonable function of the de-identification circuit. Whether a privacy level of the de-identification data is sufficient is judged. When the privacy level of the de-identification data is sufficient, the de-identification data is output. When the privacy level of the de-identification data is insufficient, the de-identification data is input to a computing circuit as another input data.

Based on the above, the computing circuit with the de-identified architecture, the data computing method, the data processing system, and the data de-identification method of the disclosure may use the analog offset error to generate the de-identification data through the de-identification circuit.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DETAILED DESCRIPTION OF DISCLOSURED EMBODIMENTS

Figure 1:
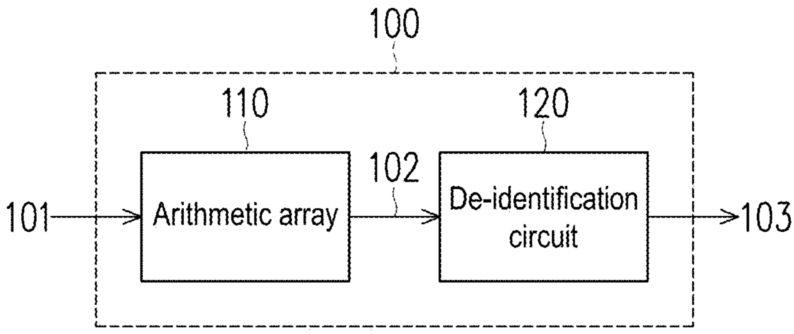
FIG. 1 is a schematic diagram of a computing circuit according to an embodiment of the disclosure.

FIG. 1 is a schematic diagram of a computing circuit 100 according to an embodiment of the disclosure. Please refer to FIG. 1. The computing circuit 100 includes an arithmetic array 110 and a de-identification circuit 120. The arithmetic array 110 is coupled to the de-identification circuit 120. In the embodiment, the arithmetic array 110 may be a computing in memory array of memories capable of implementing computing in memory (CIM) and may generate accumulated data 102 according to input data 101. In some embodiments, the memory may be a dynamic random access memory (DRAM), a static random access memory (SRAM), a flash memory, a magnetoresistive random access memory (MRAM), a ferroelectric random access memory (FRAM or FeRAM), a resistive random access memory (ReRAM or RRAM), etc., but the disclosure is not limited thereto. In some embodiments, the arithmetic array 110 may be implemented in the form of a complementary computing in memory architecture. The de-identification circuit 120 may be used to read the accumulated data 102 of the arithmetic array 110 and perform a de-identification action on the accumulated data 102 to generate de-identification data 103.

Figure 2:
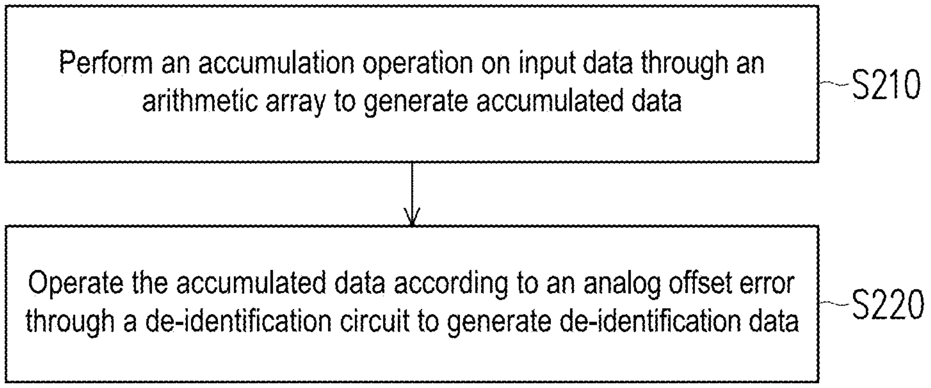
FIG. 2 is a flowchart of a data computing method according to an embodiment of the disclosure.

FIG. 2 is a flowchart of a data computing method according to an embodiment of the disclosure. Please refer to FIG. 1 and FIG. 2 at the same time. The computing circuit 100 may execute steps S210 to S220 below. In the embodiment, the computing circuit 100 may obtain the input data 101. In some embodiments, the input data 101 may be image data, audio data, medical data, personal data, or data with privacy, but the disclosure is not limited thereto. In step S210, the arithmetic array 110 may perform an accumulation operation on the input data 101 to generate the accumulated data 102. In step S220, the de-identification circuit 120 may have an analog offset error determined based on an analog physical unclonable function (PUF), so the de-identification circuit 120 may operate the accumulated data 102 according to the analog offset error, and perform de-identification processing on the accumulated data 102 to generate the de-identification data 103. In some embodiments, the analog offset error is generated by a process error of at least one transistor in the de-identification circuit 120. In some embodiments, the de-identification circuit 120 may also include an amplifier circuit. The amplifier circuit may include at least one transistor. The analog offset error may specifically be generated by a process error of a transistor in the amplifier circuit, but the disclosure is not limited thereto.

In some embodiments, the arithmetic array 110 may include multiple computing in memory units. The computing in memory units may be used to receive the input data 101, and perform computation in memory. In some embodiments, the computing in memory may be a logic operation, vector-matrix multiplication, a neural network operation, etc., but the disclosure is not limited thereto. In some embodiments, the computing in memory may be to multiply the input data 101 with corresponding weight values through the computing in memory units to generate multiple computing values, and the computing values are output to the de-identification circuit 120 after being accumulated, but the disclosure is not limited thereto.

Figure 3A:
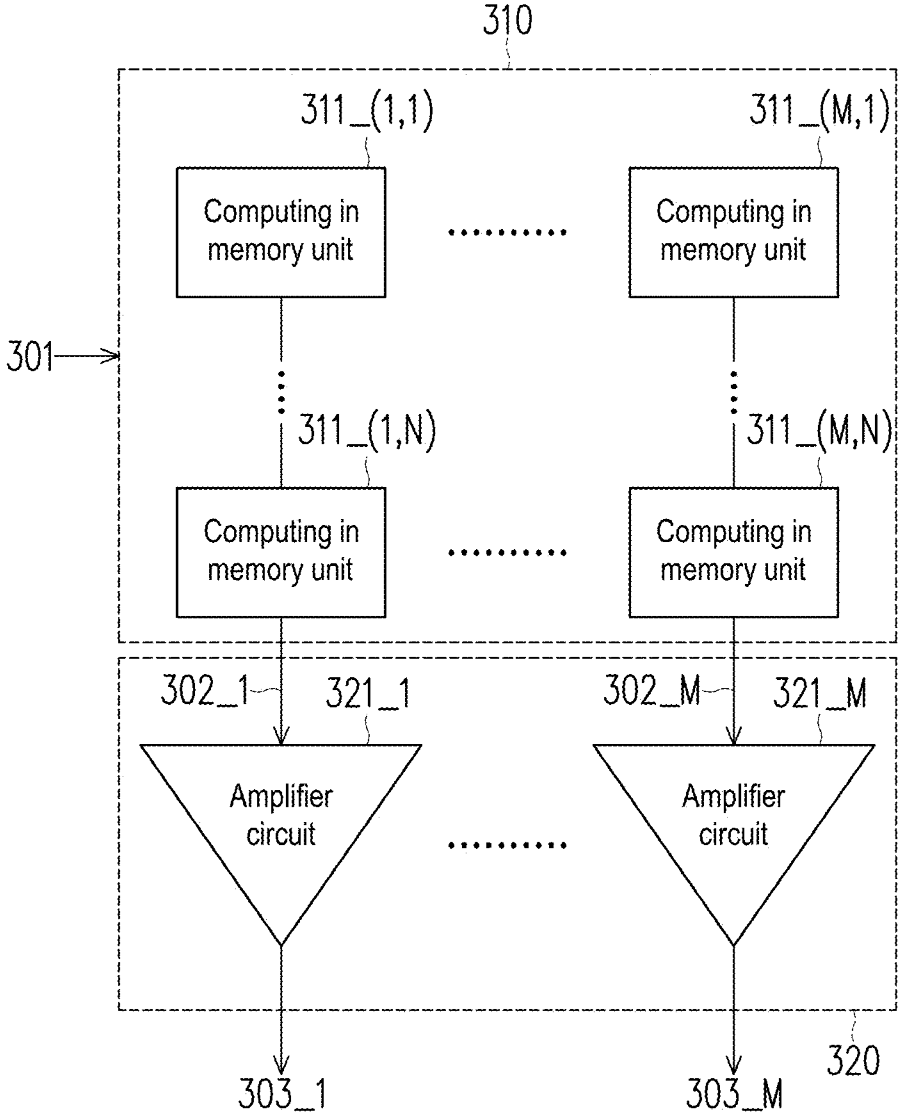
FIG. 3A is a schematic architectural diagram of a computing circuit according to an embodiment of the disclosure.

More specifically, FIG. 3A is a schematic architectural diagram of a computing circuit 300 according to an embodiment of the disclosure. Please refer to FIG. 3A. An arithmetic array and a de-identification circuit may be implemented as the architecture shown in FIG. 3A, but the disclosure is not limited thereto. In the embodiment, the computing circuit 300 includes an arithmetic array 310 and a de-identification circuit 320. The arithmetic array 310 may include multiple computing in memory units 311_(1,1) to 311_(M,N), where N and M are both positive integers. The computing in memory units 311_(1,1) to 311_(M,N) may be arranged in an array to form the arithmetic array 310. The computing in memory unit 311_(1,1) to 311_(M,N) may receive input data 301, and respectively perform computation in memory to store multiple computing results.

In the embodiment, the de-identification circuit 320 may include multiple amplifier circuits 321_1 to 321_M. The amplifier circuits 321_1 to 321_M may receive multiple accumulated data 302_1 to 302_M output by the arithmetic array 310, and output multiple de-identification data 303_1 to 303_M. As shown in FIG. 3A, in some embodiments, each row of the computing in memory units 311_(1,1) to 311_(M,N) may be coupled to one amplifier circuit. Specifically, the amplifier circuit 321_1 may be coupled to the computing in memory unit 311_(1,N) and may receive the computing result of each of the computing in memory units 311_(1,1) to 311_(1,N), that is, the accumulated data 302_1 after accumulation. By analogy, the amplifier circuit 321_M may be coupled to the computing in memory unit 311_(M, N) and may receive the computing result of each of the computing in memory units 311_(M,1) to 311_(M,N), that is, the accumulated data 302_M after accumulation.

In the embodiment, each of the amplifier circuits 321_1 to 321_M may include at least one transistor, and an analog offset error of the de-identification circuit 320 includes at least one error coefficient. The error coefficient is provided by the at least one transistor, wherein the specific implementation of the amplifier circuits 321_1 to 321_M will be specifically described in the following embodiments.

Figure 3B:
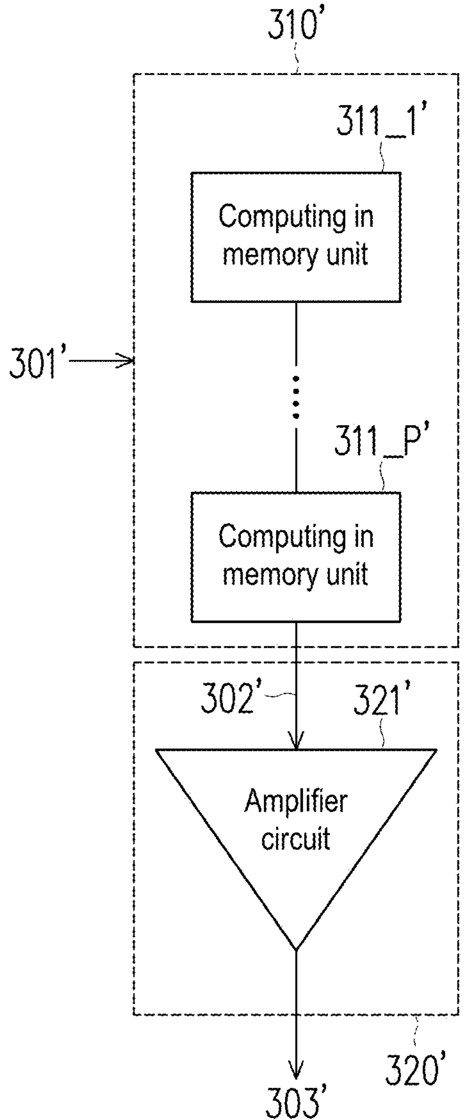
FIG. 3B is a schematic architectural diagram of a computing circuit according to another embodiment of the disclosure.

FIG. 3B is a schematic architectural diagram of a computing circuit 300' according to another embodiment of the disclosure. Please refer to FIG. 3B. An arithmetic array and a de-identification circuit may also be implemented as the architecture shown in FIG. 3B. In the embodiment, the computing circuit 300' includes an arithmetic array 310' and a de-identification circuit 320'. The arithmetic array 310' may include multiple computing in memory units 311_1' to 311_P', where P is a positive integer. The computing in memory units 311_1' to 311_P' may be sequentially coupled. The computing in memory units 311_1' to 311_P' may receive input data 301', and respectively perform computation in memory to store multiple computing results.

In the embodiment, the de-identification circuit 320' may include an amplifier circuit 321'. The amplifier circuit 321' may receive accumulated data 302' output by the arithmetic array 310', and output de-identification data 303'. As shown in FIG. 3B, in some embodiments, the computing in memory units 311_1' to 311_P' may be coupled to the amplifier circuit 321'. Specifically, the amplifier circuit 321' may be coupled to the computing in memory unit 311_P' and may receive the computing result of each of the computing in memory units 311_1' to 311_P', that is, the accumulated data 302' after accumulation.

In the embodiment, the amplifier circuit 321' may include at least one transistor, and an analog offset error of the de-identification circuit 320' includes at least one error coefficient. The error coefficient is provided by the at least one transistor, wherein the specific implementation of the amplifier circuit 321' will be specifically described in the following embodiments.

Figure 4:
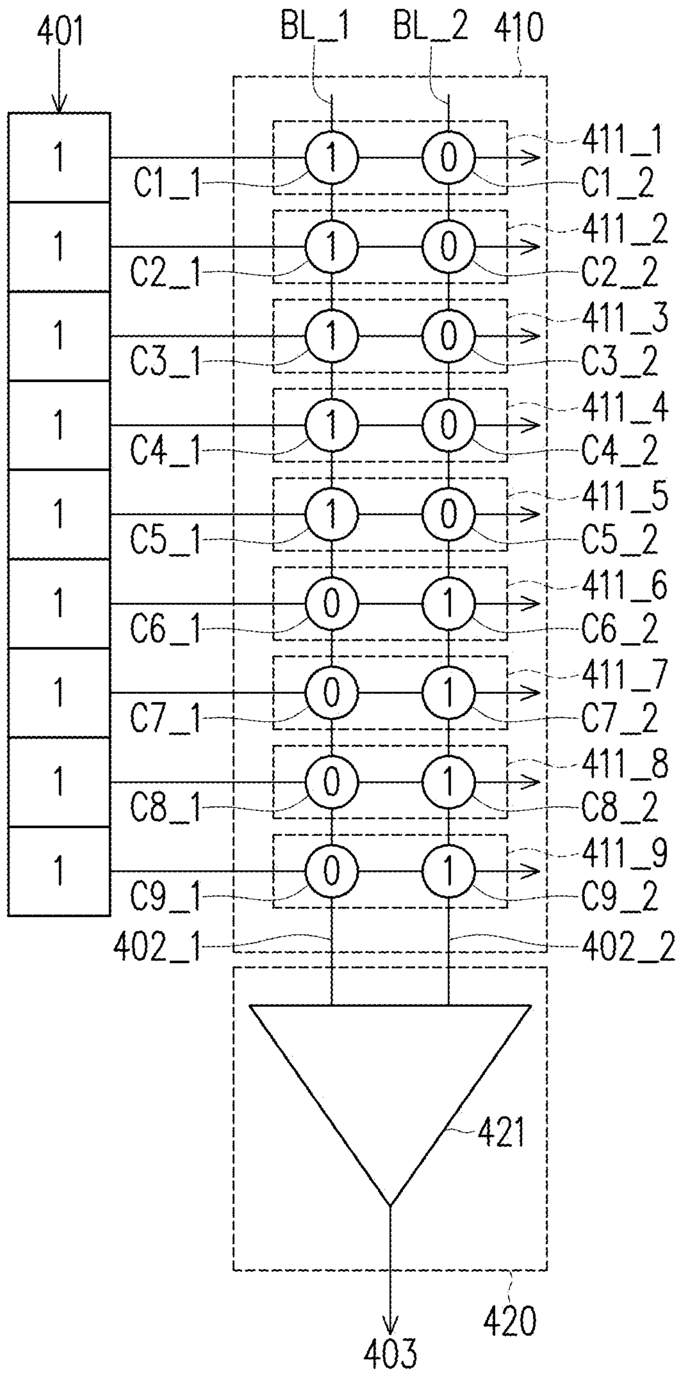
FIG. 4 is a schematic circuit diagram of a computing circuit according to an embodiment of the disclosure.

FIG. 4 is a schematic circuit diagram of a computing circuit 400 according to an embodiment of the disclosure. Please refer to FIG. 4. An arithmetic array and a de-identification circuit may also be implemented as the circuit architecture shown in FIG. 4, but the disclosure is not limited thereto. In the embodiment, the computing circuit 400 includes an arithmetic array 410 and a de-identification circuit 420. The arithmetic array 410 may be implemented with a complementary computing in memory architecture. The arithmetic array 410 may include computing in memory units 411_1 to 411_9. The de-identification circuit 420 may include an amplifier circuit 421. The computing in memory units 411_1 to 411_9 may include multiple sub-computing circuits C1_1 to C9_1 and C1_2 to C9_2. The sub-computing circuits C1_1 to C9_1 are coupled in series to a first input terminal of the amplifier circuit 421 through a bit line BL_1, and the sub-computing circuits C1_2 to C9_2 are coupled in series to a second input terminal of the amplifier circuit 421 through a bit line BL_2.

In the embodiment, input data 401 may be binary data, such as "111111111", and the input data 401 may be first written into a buffer (not shown) of the computing circuit 400. In some embodiments, the sub-computing circuits C1_1 to C9_1 and C1_2 to C9_2 may respectively obtain corresponding weight value data through the bit lines BL_1 and BL_2, and perform operations according to corresponding bit data in the input data 401 to store corresponding computing results. As shown in FIG. 4, for example, the sub-computing circuits C1_1 to C9_1 may sequentially store bit data "111110000", and the sub-computing circuits C1_2 to C9_2 may sequentially store bit data "000001111".

More specifically, the sub-computing circuits C1_1 to C9_1 may perform an accumulation operation on multiple bit data, and output first accumulated data 402_1 to a first terminal of the amplifier circuit 421. Similarly, the sub-computing circuits C1_2 to C9_2 may perform an accumulation operation on multiple bit data, and output second accumulated data 402_2 to a second terminal of the amplifier circuit 421. In some embodiments, some circuits at the first terminal and the second terminal of the amplifier circuit 421 may include at least one transistor, and an analog offset error of the de-identification circuit 420 may include at least one error coefficient. The error coefficient is provided by the at least one transistor. It is worth noting that in some embodiments, the error coefficient may also be provided by at least one resistor or a combination thereof, but the disclosure is not limited thereto.

For example, the first terminal of the amplifier circuit 421 may receive an accumulation result corresponding to the bit data "111110000". For example, the accumulation result is value 5 (that is, =1+1+1+1+1+0+0+0+0). The second terminal of the amplifier circuit 421 may receive an accumulation result corresponding to the bit data "000001111", that is, another accumulation result of value 4 (=0+0+0+0+0+1+1+1+1). In this regard, due to the influence of the corresponding analog offset error, a gain value of the first terminal of the amplifier circuit 421 may be, for example, 0.8, and a gain value of the second terminal of the amplifier circuit 421 may be, for example, 1.2. In this way, the first terminal of the amplifier circuit 421 may generate an input corresponding to a value of 4 (that is, $=5\times0.8$), and the second terminal of the amplifier circuit 421 may generate an input corresponding to a value of 4.8 (that is, $=4\times1.2$). To sum up, an output terminal of the amplifier circuit 421 may be equivalent to outputting de-identification data 403 with a bit value of 0 and optimal de-identification.

It should be noted that if there is no influence of the analog offset error, the first terminal of the amplifier circuit 421 may generate the input corresponding to the value of 5, and the second terminal of the amplifier circuit 421 may generate the input corresponding to the value of 4. Therefore, the output terminal of the amplifier circuit 421 is equivalent to outputting a bit value of 1, which means that a result of direct accumulation of the input data cannot achieve any de-identification. In other words, the amplifier circuit 421 may use the influence of the analog offset error to effectively generate the de-identification data 403.

Figure 5:
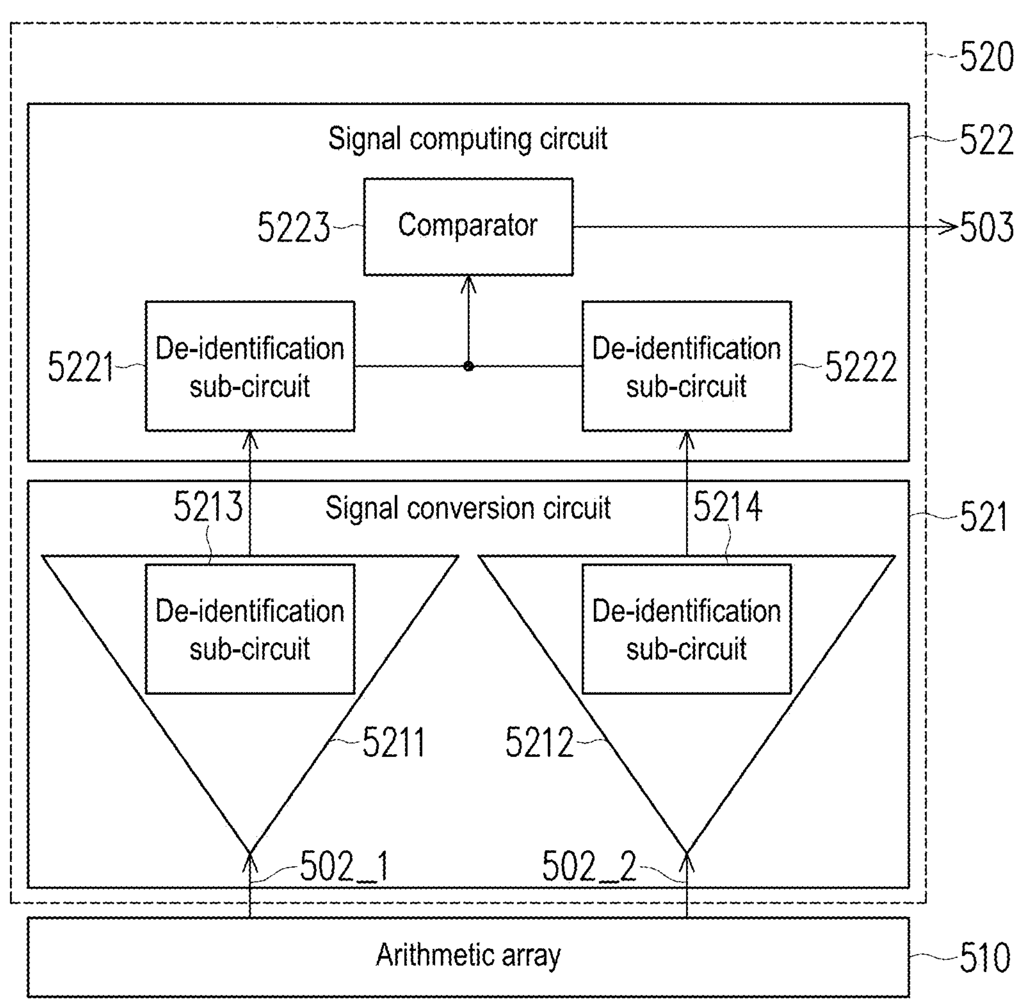
FIG. 5 is a schematic architectural diagram of a de-identification circuit according to an embodiment of the disclosure.

FIG. 5 is a schematic architectural diagram of a de-identification circuit 520 according to an embodiment of the disclosure. Please refer to FIG. 5. A de-identification circuit may be implemented as the architecture of the de-identification circuit 520 shown in FIG. 5. In the embodiment, the de-identification circuit 520 may be an amplifier circuit and includes a signal conversion circuit 521 and a signal computing circuit 522. The signal conversion circuit 521 is coupled to an arithmetic array 510. In the embodiment, the arithmetic array 510 may be implemented with the complementary computing in memory architecture described in the embodiment of FIG. 4 as an example. A first input terminal and a second input terminal of the de-identification circuit 520 may be coupled to the arithmetic array 510 and receive first accumulated data 502_1 and second accumulated data 502_2.

In the embodiment, the signal conversion circuit 521 includes signal conversion units 5211 and 5212. The signal conversion units 5211 and 5212 respectively have de-identification sub-circuits 5213 and 5214. The de-identification sub-circuit 5213 is coupled to the arithmetic array 510 through a first input terminal of the signal conversion circuit 521 and receives the first accumulated data 502_1. The de-identification sub-circuit 5214 is coupled to the arithmetic array 510 through a second input terminal of the signal conversion circuit 521 and receives the second accumulated data 502_2. In the embodiment, the signal computing circuit 522 may include de-identification sub-circuits 5221 and 5222 and a comparator 5223. The de-identification sub-circuit 5221 is coupled to the signal conversion unit 5211 of the signal conversion circuit 521 and the comparator 5223. The de-identification sub-circuit 5222 is coupled to the signal conversion unit 5112 of the signal conversion circuit 521 and the comparator 5223.

In some embodiments, the de-identification sub-circuits 5213, 5214, 5221, and 5222 may respectively include at least one transistor. In addition, the number of de-identification sub-circuits of the disclosure is not limited to as shown in FIG. 5. For example, the signal conversion circuit 521 and the signal computing circuit 522 may include at least one de-identification sub-circuit.

For example, the de-identification sub-circuits 5213 and 5214 may respectively provide error coefficients "A1" and "A2" for signal conversion (that is, for performing data operations) through at least one internal transistor. The de-identification sub-circuits 5221 and 5222 may respectively provide error coefficients "A3" and "A4" for signal conversion through at least one internal transistor. The analog offset error of the embodiment may include the error coefficients "A1" to "A4".

More specifically, the de-identification sub-circuit 5213 may receive a first signal (such as being represented by a numeral "I1") of the first accumulated data 502_1, and output a result of multiplying the first signal by the error coefficient "A1", that is, a first conversion signal (that is, "I1×A1") to the de-identification sub-circuit 5221. The de-identification sub-circuit 5214 may receive a second signal (represented by a numeral "I2") of the second accumulated data 502_2, and output a result of multiplying the second signal by the error coefficient "A2", that is, a second conversion signal (that is, "I2×A2") to the de-identification sub-circuit 5222. Then, the de-identification sub-circuit 5221 and the de-identification sub-circuit 5222 may output a conversion result to the comparator 5223 according to the first conversion signal and the second conversion signal, so that the comparator 5223 may generate de-identification data according to the conversion result.

More specifically, the de-identification sub-circuit 5221 may receive the first conversion signal and output a result of multiplying the first conversion signal by the error coefficient "A3", that is, a third conversion signal (that is, "I1×A1×A3") to the comparator 5223. Similarly, the de-identification sub-circuit 5222 may receive the second conversion signal and output a result of multiplying the second conversion signal by the error coefficient "A4", that is, a fourth conversion signal (that is, "I2×A2×A4") to the comparator 5223. To sum up, the comparator 5223 may output a comparison result of the third conversion signal and the fourth conversion signal (that is, "(I1×A1×A3)−(I2×A2×A4)"), that is, de-identification data 503.

Figure 6A:
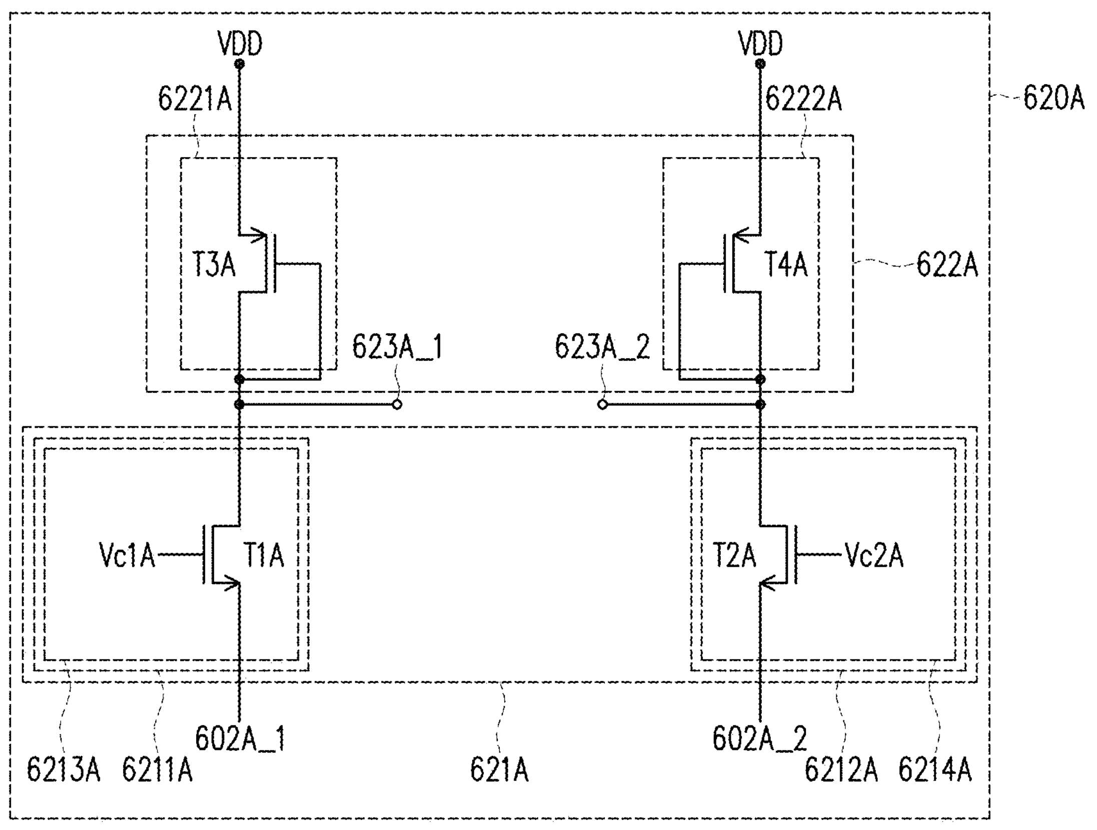
FIG. 6A to FIG. 6C are schematic circuit diagrams of amplifier circuits according to multiple embodiments of the disclosure.
Figure 6B:
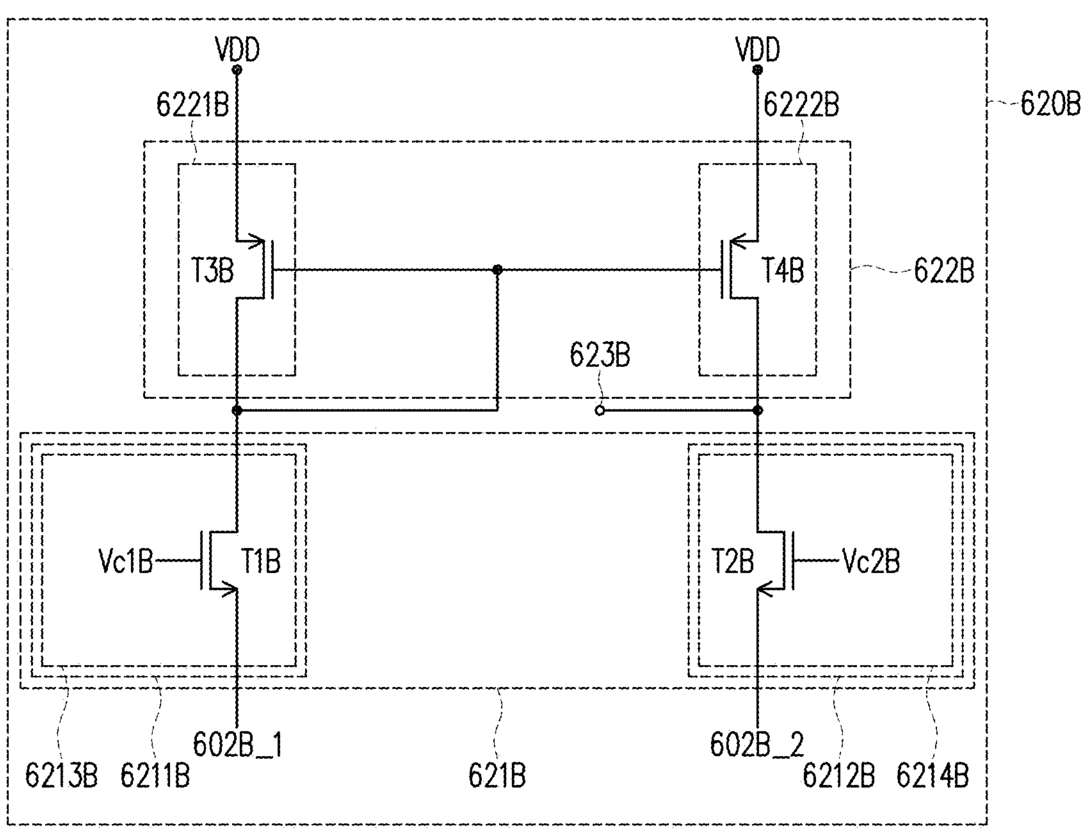
Figure 6C:
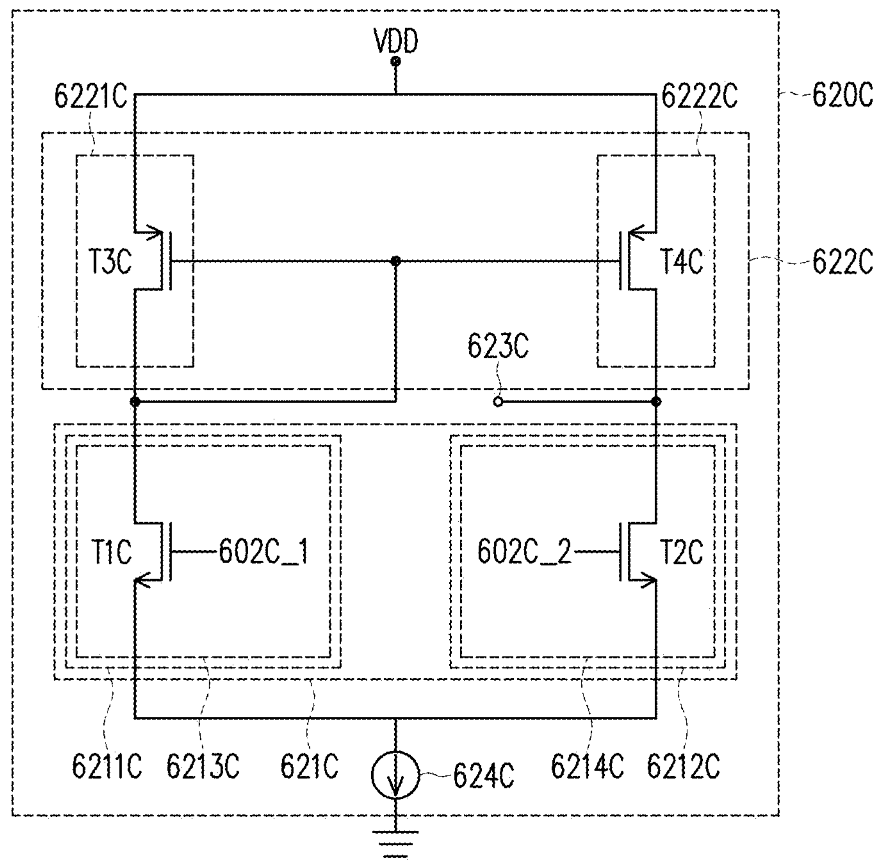

FIG. 6A to FIG. 6C are schematic circuit diagrams of amplifier circuits 620A, 620B, and 620C according to multiple embodiments of the disclosure. Please refer to FIG. 6A. An amplifier circuit may be implemented as the circuit architecture of a differential amplifier shown in FIG. 6A. In the embodiment, the amplifier circuit 620A includes a signal conversion circuit 621A and a signal computing circuit 622A. The signal conversion circuit 621A includes a signal conversion unit 6211A and a signal conversion unit 6212A, and the signal conversion units 6211A and 6212A include de-identification sub-circuits 6213A and 6214A. The signal conversion circuit 622A includes a de-identification sub-circuit 6221A and a de-identification sub-circuit 6222A.

In the embodiment, the de-identification sub-circuits 6213A, 6214A, 6221A, and 6222A may include transistors T1A to T4A. In the embodiment, the transistors T1A and T2A are N type transistors, and the transistors T3A and T4A are P type transistors, wherein the disclosure is not limited thereto, and the design may be adjusted according to actual requirements.

In the embodiment, a first terminal of the transistor T1A is coupled to a second terminal of the transistor T3A and an output terminal 623A_1. A control terminal of the transistor T1A may receive a clamping voltage Vc1A. A second terminal of the transistor T1A receives a first signal 602A_1 of accumulated data. A first terminal of the transistor T2A is coupled to a second terminal of the transistor T4A and an output terminal 623A_2. A control terminal of the transistor T2A may receive a clamping voltage Vc2A. A second terminal of the transistor T2A receives a second signal 602A_2 of accumulated data. A first terminal of the transistor T3A is coupled to an operating voltage VDD. The second terminal of the transistor T3A is coupled to a control terminal of the transistor T3A, the first terminal of the transistor T1A, and the output terminal 623A_1. A first terminal of the transistor T4A is coupled to the operating voltage VDD. The second terminal of the transistor T4A is coupled to a control terminal of the transistor T4A, the first terminal of the transistor T2A, and the output terminal 623A_2.

In some embodiments, the first signal 602A_1 and the second signal 602A_2 may be current signals. In some embodiments, at least one of the transistors T1A to T4A may respectively have different analog offset errors due to process errors, but the disclosure is not limited thereto.

In the embodiment, the first signal 602A_1 flows through the transistors T1A and T3A and is converted into a conversion signal with an analog offset error. The conversion signal may be output to the output terminal 623A_1. The second signal 602A_2 flows through the transistors T2A and T4A and is converted into another conversion signal with an analog offset error. The conversion signal may be output to the output terminal 623A_2. To sum up, the output terminals 623A_1 and 623A_2 may output a differential signal of a conversion result with an analog offset error to a back-end comparator (for example, the comparator 5223 of FIG. 5), so that the back-end comparator may perform an operation to generate de-identification data.

Please refer to FIG. 6B. An amplifier circuit may be implemented as the circuit architecture of a current mirror type sensing amplifier shown in FIG. 6B. In the embodiment, the amplifier circuit 620B includes a signal conversion circuit 621B and a signal computing circuit 622B. The signal conversion circuit 621B includes a signal conversion unit 6211B and a signal conversion unit 6212B, and the signal conversion units 6211B and 6212B include de-identification sub-circuits 6213B and 6214B. The signal conversion circuit 622B includes a de-identification sub-circuit 6221B and a de-identification sub-circuit 6222B.

In the embodiment, the de-identification sub-circuits 6213B, 6214B, 6221B, and 6222B may include transistors T1B to T4B. In the embodiment, the transistors T1B and T2B are N type transistors, and the transistors T3B and T4B are P type transistors, wherein the disclosure is not limited thereto, and the design may be adjusted according to actual requirements.

In the embodiment, a first terminal of the transistor T1B is coupled to a second terminal and a control terminal of the transistor T3B. A control terminal of the transistor T1B may receive a clamping voltage Vc1B. A second terminal of the transistor T1B receives a first signal 602B_1 of accumulated data. A first terminal of the transistor T2B is coupled to a second terminal of the transistor T4B and an output terminal 623B. A control terminal of the transistor T2B may receive a clamping voltage Vc2B. A second terminal of the transistor T2B receives a second signal 602B_2 of accumulated data. A first terminal of the transistor T3B is coupled to the operating voltage VDD. A second terminal of the transistor T3B is coupled to the control terminal of the transistor T3B and the first terminal of the transistor T1B. A first terminal of the transistor T4B is coupled to the operating voltage VDD. The second terminal of the transistor T4B is coupled to the first terminal of the transistor T2B and the output terminal 623B.

In some embodiments, the first signal 602B_1 and the second signal 602B_2 may be current signals. In some embodiments, at least one of the transistors T1B to T4B may respectively have different analog offset errors due to process errors, but the disclosure is not limited thereto.

In the embodiment, the first signal 602B_1 flows through the transistors T1B and T3B and is converted into a conversion signal with an analog offset error. The second signal 602B_2 flows through the transistors T2B and T4B and is converted into another conversion signal with an analog offset error. To sum up, the output terminal 623B may output a voltage signal of a conversion result with an analog offset error (that is, a result of subtracting the conversion signal from another conversion signal) to a back-end comparator (for example, the comparator 5223 of FIG. 5), so that the back-end comparator may perform an operation to generate de-identification data.

Please refer to FIG. 6C. An amplifier circuit may be implemented as the circuit architecture of a current mirror sensing amplifier shown in FIG. 6C. In the embodiment, the amplifier circuit 620C includes a signal conversion circuit 621C and a signal computing circuit 622C. The signal conversion circuit 621C includes a signal conversion unit 6211C and a signal conversion unit 6212C, and the signal conversion units 6211C and 6212C include de-identification sub-circuits 6213C and 6214C. The signal conversion circuit 622C includes a de-identification sub-circuit 6221C and a de-identification sub-circuit 6222C. The de-identification sub-circuits 6213C, 6214C, 6221C, and 6222C include transistors T1C to T4C.

Reference may be made to the content described in the embodiment of the amplifier circuit 620B of FIG. 6B for the circuit structure of the amplifier circuit 620C. More specifically, reference may be made to the signal computing circuit 622B described in FIG. 6B for the architecture of the signal computing circuit 622C, and similar content will not be described again.

It is worth noting that a control terminal of the transistor T1C may receive a first signal 602C_1 of accumulated data. A second terminal of the transistor T1C may be coupled to a reference current source 624C. A control terminal of the transistor T2C may receive a second signal 602C_2 of accumulated data. A second terminal of the transistor T2C may be coupled to a reference current source 624C.

In some embodiments, the first signal 602C_1 and the second signal 602C_2 may be voltage signals. In some embodiments, at least one of the transistors T1C to T4C may respectively have different analog offset errors due to process errors, but the disclosure is not limited thereto.

In the embodiment, the first signal 602C_1 flows through the transistors T1C and T3C and is converted into a conversion signal with an analog offset error. The second signal 602C_2 flows through the transistors T2C and T4C and is converted into another conversion signal with an analog offset error. Therefore, the output terminal 623C may output a voltage signal of a conversion result with an analog offset error (that is, a result of subtracting the conversion signal from another conversion signal) to a back-end comparator (for example, the comparator 5223 of FIG. 5), so that the back-end comparator may perform an operation to generate de-identification data.

Figure 7:
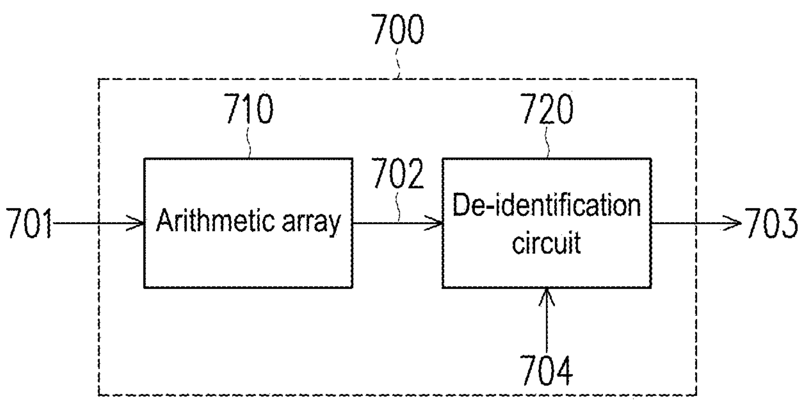
FIG. 7 is a schematic diagram of a computing circuit according to another embodiment of the disclosure.

FIG. 7 is a schematic diagram of a computing circuit 700 according to another embodiment of the disclosure. Please refer to FIG. 7. The computing circuit 700 includes an arithmetic array 710 and a de-identification circuit 720. The arithmetic array 710 is coupled to the de-identification circuit 720. In the embodiment, reference may be made to the computing circuit 100 described in FIG. 1 for the architecture of the computing circuit 700, and similar content will not be described again. It is worth noting that the de-identification circuit 720 may be used to read accumulated data 702 of the arithmetic array 710 and receive an offset control signal 704. The de-identification circuit 720 may perform a de-identification action on the accumulated data 702 according to the offset control signal 704 to generate de-identification data 703.

More specifically, the computing circuit 700 may obtain input data 701. The arithmetic array 710 may perform an accumulation operation on the input data 701 to generate accumulated data 702. Next, the de-identification circuit 720 may receive the offset control signal 704 and calculate the accumulated data 702 according to the offset control signal 704 and an analog offset error to generate the de-identification data 703. It should be noted that the analog offset error is generated by a process error of at least one transistor in the de-identification circuit 720, but the disclosure is not limited thereto.

In some embodiments, the offset control signal 704 may be used to control at least one other transistor in the de-identification circuit 720 to generate an additional analog offset error. Therefore, the de-identification circuit 720 may use an analog offset error determined based on an analog physical unclonable function and the additional analog offset error generated based on the offset control signal 704 to perform de-identification processing on the accumulated data 702 to generate the de-identification data 703. In other words, the additional analog offset error may be changed according to the input of different offset control signals (also referred to as obfuscated codes). To sum up, the degree of de-identification of the de-identification data 703 is adjustable. In some embodiments, when the de-identification circuit 720 does not receive the externally input offset control signal 704, the de-identification circuit 720 may still generate an additional analog offset error according to a fixed parameter without any preset (for example, a process error of a transistor), that is, the computing circuit 100 of FIG. 1.

In addition, regarding other technical features and implementations of the computing circuit 700 of the embodiment, reference may be made to the descriptions of the embodiments of FIG. 1 to FIG. 4 to obtain sufficient teachings, suggestions, and implementation illustrations, so no further description will be given.

Figure 8:
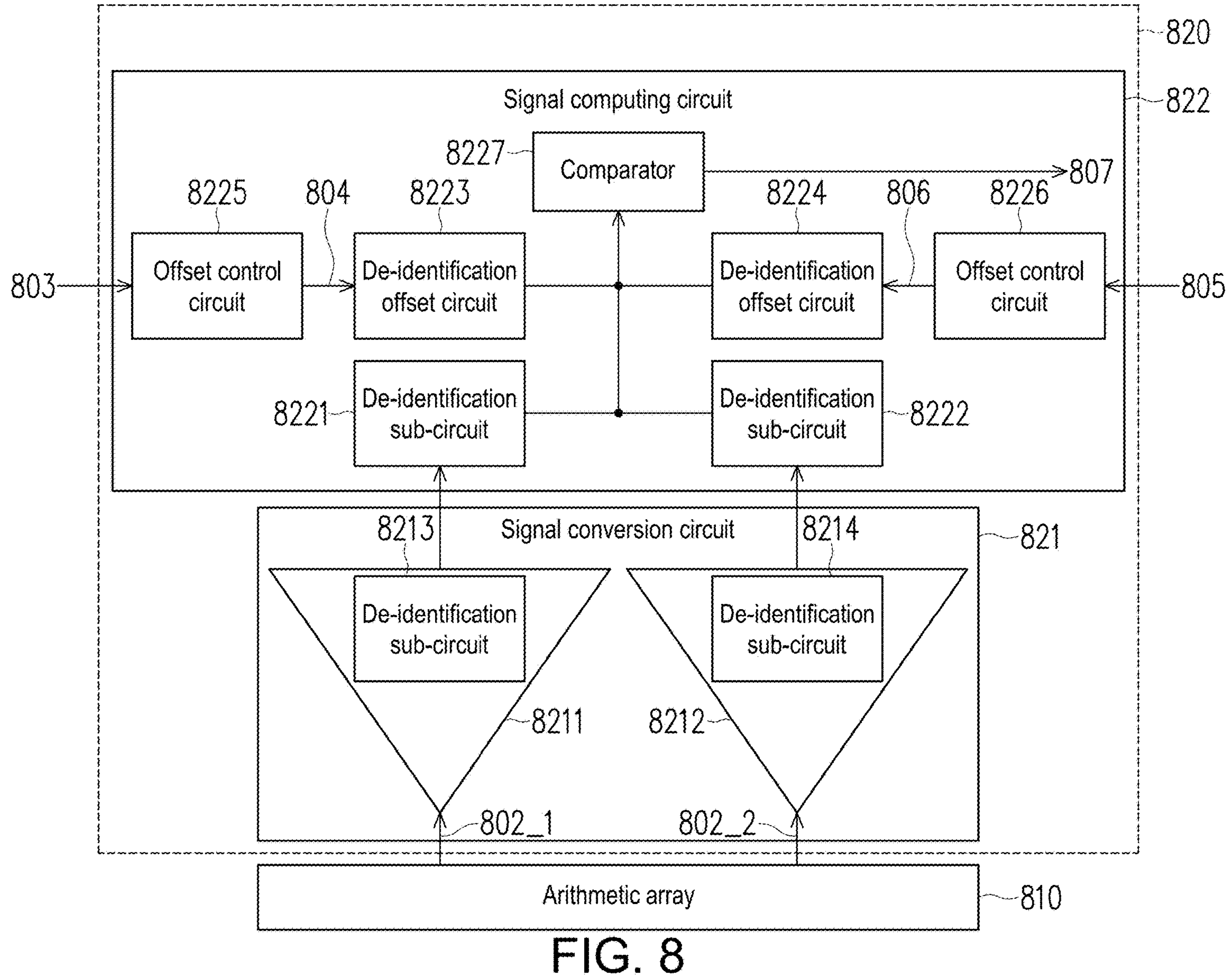
FIG. 8 is a schematic architectural diagram of a de-identification circuit according to another embodiment of the disclosure.

FIG. 8 is a schematic architectural diagram of a de-identification circuit 820 according to another embodiment of the disclosure. Please refer to FIG. 8. A de-identification circuit may be implemented as the architecture of the de-identification circuit 820 shown in FIG. 8. In the embodiment, the de-identification circuit 820 may be an amplifier circuit and includes a signal conversion circuit 821 and a signal computing circuit 822. The signal conversion circuit 821 is coupled to the arithmetic array 810. In the embodiment, the arithmetic array 810 may be implemented with the complementary computing in memory architecture described in the embodiment of FIG. 4 as an example. Reference may be made to the content described in the embodiment of the de-identification circuit 520 shown in FIG. 5 for the architecture of the de-identification circuit 820. Similar content of the signal conversion circuit 821, signal conversion units 8211 and 8212, de-identification sub-circuits 8213, 8214, 8221, and 8222, and the signal computing circuit 822 will not be described again.

It is worth noting that the signal computing circuit 822 may also include de-identification offset circuits 8223 and 8224 and offset control circuits 8225 and 8226. The de-identification sub-circuit 8221 is coupled to the signal conversion unit 8211 of the signal conversion circuit 821, the de-identification offset circuit 8223, and a comparator 8227. The de-identification sub-circuit 8222 is coupled to the signal conversion unit 8212 of the signal conversion circuit 821, the de-identification offset circuit 8224, and the comparator 8227. The de-identification offset circuit 8223 is also coupled to the offset control circuit 8225. The de-identification offset circuit 8224 is also coupled to the offset control circuit 8226. In some embodiments, at least one of the signal conversion circuit 821 and the signal computing circuit 822 may include the de-identification offset circuits 8223 and 8224, which is not limited to as shown in FIG. 8. In this regard, in some embodiments, all circuit elements of the de-identification offset circuits 8223 and 8224 may be disposed in the signal conversion circuit 821 or the signal computing circuit 822. Alternatively, in other embodiments, a part of the circuit elements of the de-identification offset circuits 8223 and 8224 may be disposed in the signal conversion circuit 821, and another part of the circuit elements of the de-identification offset circuits 8223 and 8224 may be disposed in the signal computing circuit 822. In addition, it should be noted that the configuration number and the configuration position of the de-identification sub-circuit, the de-identification offset circuit, and/or the offset control circuit of the signal conversion circuit and/or the signal computing circuit of the embodiment of FIG. 8 are not limited to as shown in the drawing. In some embodiments of the disclosure, the de-identification sub-circuit or the de-identification offset circuit of the signal conversion circuit and/or the signal computing circuit of the embodiment of FIG. 8 may also be designed according to the same or similar concepts of the context.

In some embodiments, the offset control circuits 8225 and 8226 may be used to receive digital obfuscated codes (digital encoding) and generate analog control voltages according to the digital obfuscated codes to serve as offset control signals.

In some embodiments, the de-identification sub-circuits 8213, 8214, 8221, and 8222 and the de-identification offset circuits 8223 and 8224 may respectively include at least one transistor. In addition, the number of the de-identification sub-circuits 8213, 8214, 8221, and 8222 and the de-identification offset circuits 8223 and 8224 of the disclosure is not limited to as shown in FIG. 8. For example, the signal conversion circuit 821 and the signal computing circuit 822 may include at least one de-identification sub-circuit.

In the embodiment, the offset control circuit 8225 may receive an obfuscated code 803, and the offset control circuit 8225 may determine at least one offset control signal according to the obfuscated code 803. The offset control circuit 8225 may output the at least one offset control signal to at least one transistor in the de-identification offset circuit 8223. Similarly, the offset control circuit 8226 may receive an obfuscated code 805, and the offset control circuit 8226 may determine at least one offset control signal according to the obfuscated code 805. The offset control circuit 8226 may output the at least one offset control signal to at least one transistor in the de-identification offset circuit 8224. More specifically, the offset control circuit 8225 may output an offset control signal 804 to the de-identification offset circuit 8223, so that the de-identification offset circuit 8223 may generate an additional analog offset error according to the offset control signal 804. Similarly, the offset control circuit 8226 may output an offset control signal 806 to the de-identification offset circuit 8224, so that the de-identification offset circuit 8224 may generate an additional analog offset error according to the offset control signal 806.

In some embodiments, when the offset control circuits 8225 and 8226 do not receive the externally input obfuscated codes 803 and 805, the offset control circuits 8225 and 8226 may still generate additional analog offset errors according to fixed parameters without any preset (for example, process errors of transistors). In addition, the offset control circuits 8225 and 8226 may also be integrated into a single control circuit and are not limited to the architecture shown in FIG. 8.

For example, the de-identification sub-circuits 8213, 8214, 8221, and 8222 may respectively provide error coefficients "A1", "A2", "A3", and "A4" for signal conversion through at least one internal transistor. The de-identification offset circuits 8223 and 8224 may respectively provide error coefficients "A5" and "A6" according to the offset control signals 804 and 806 and at least one internal transistor. The analog offset errors of the embodiment may include the error coefficients "A1" to "A6".

More specifically, the de-identification sub-circuit 8213 may receive a first signal (such as being represented by a numeral "I1") of first accumulated data 802_1, and output a result of multiplying the first signal by the error coefficient "A1", that is, a first conversion signal (that is, "I1×A1") to the de-identification sub-circuit 8221. The de-identification sub-circuit 8214 may receive a second signal (represented by a numeral "I2") of second accumulated data 8022, and output a result of multiplying the second signal by the error coefficient "A2", that is, a second conversion signal (that is "I2×A2") to the de-identification sub-circuit 8222. Then, the de-identification sub-circuit 8221 and the de-identification offset circuit 8223 may output a conversion result to the comparator 8227 according to the first conversion signal, and the de-identification sub-circuit 8222 and the de-identification offset circuit 8224 may output another conversion result to the comparator 8223 according to the second conversion signal, so that the comparator 8227 may generate de-identification data according to the conversion result.

More specifically, the de-identification sub-circuit 8221 may receive the first conversion signal, and output a result of multiplying the first conversion signal by the error coefficient "A3" and the error coefficient "A5", that is, a third conversion signal (that is, "I1×A1×A3×A5") to the comparator 8227 in conjunction with the de-identification offset circuit 8223. Similarly, the de-identification sub-circuit 8222 may receive the second conversion signal, and output a result of multiplying the second conversion signal by the error coefficient "A4" and the error coefficient "A6", that is, a fourth conversion signal (that is, "I2×A2×A4×A6") to the comparator 8227 in conjunction with the de-identification offset circuit 8224. To sum up, the comparator 8227 may output a comparison result of the third conversion signal and the fourth conversion signal (that is, "(I1×A1×A3×A5)−(I2×A2×A4×A6)"), that is, de-identification data 807.

FIG. 9A to FIG. 9M are schematic circuit diagrams of amplifier circuits 920A to 920M according to other embodiments of the disclosure. It should be noted that the amplifier circuit architectures of FIG. 9A to FIG. 9M may be designed as differential type, current mirror type, etc. amplifier circuit architectures. The disclosure is not limited thereto, and the design may be adjusted according to actual requirements.

Figure 9A:
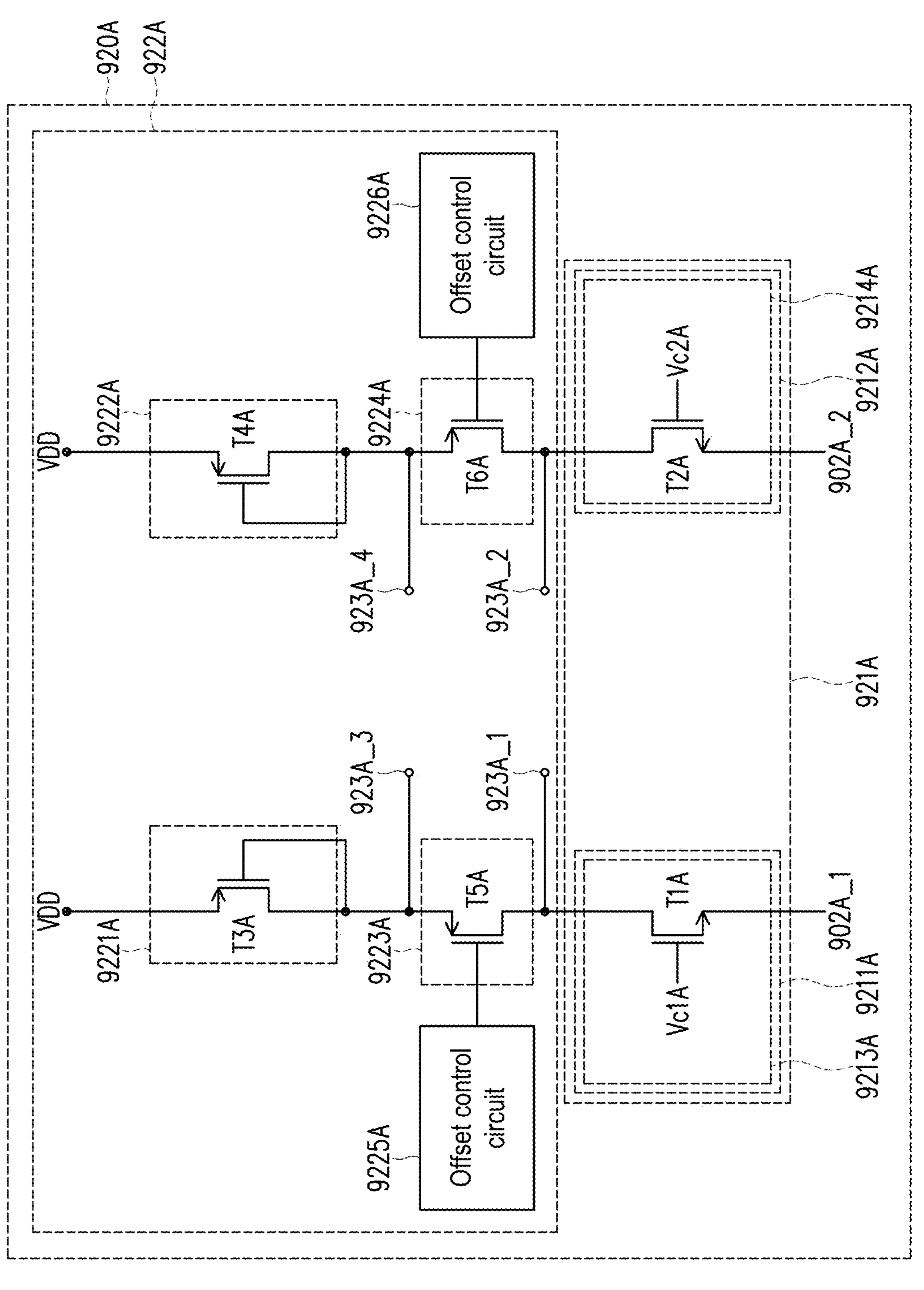
FIG. 9A to FIG. 9M are schematic circuit diagrams of amplifier circuits according to other embodiments of the disclosure.

Please refer to FIG. 9A. An amplifier circuit may be implemented as the circuit architecture shown in FIG. 9A. In the embodiment, the amplifier circuit 920A includes a signal conversion circuit 921A and a signal computing circuit 922A. The signal conversion circuit 921A includes a signal conversion unit 9211A and a signal conversion unit 9212A, and the signal conversion units 9211A and 9212A include de-identification sub-circuits 9213A and 9214A. The signal computing circuit 922A includes de-identification sub-circuits 9221A and 9222A, de-identification offset circuits 9223A and 9224A, and offset control circuits 9225A and 9226A.

In the embodiment, the de-identification sub-circuit 9213A may include a transistor T1A. The de-identification sub-circuit 9214A may include a transistor T2A. The de-identification sub-circuit 9221A may include a transistor T3A. The de-identification sub-circuit 9222A may include a transistor T4A. The de-identification offset circuit 9223A may include a transistor T5A. The de-identification offset circuit 9224A may include a transistor T6A. In some embodiments, the transistors T1A and T2A are N type transistors, and the transistors T3A, T4A, T5A, and T6A are P type transistors, but the disclosure is not limited thereto, and the design may be adjusted according to actual requirements.

In the embodiment, the transistor T5A is connected in series between the transistor T1A of the de-identification sub-circuit 9213A and the transistor T3A of the de-identification sub-circuit 9221A. The transistor T6A is connected in series between the transistor T2A of the de-identification sub-circuit 9214A and the transistor T4A of the de-identification sub-circuit 9222A.

In the embodiment, a first terminal of the transistor T1A is coupled to a second terminal of the transistor T5A and an output terminal 923A_1. A control terminal of the transistor T1A may receive a clamping voltage Vc1A. A second terminal of the transistor T1A may receive a first signal 902A_1 of accumulated data. A first terminal of the transistor T2A is coupled to a second terminal of the transistor T6A and an output terminal 923A_2. A control terminal of the transistor T2A may receive a clamping voltage Vc2A. A second terminal of the transistor T2A may receive a second signal 902A_2 of accumulated data. A first terminal of the transistor T5A is coupled to a second terminal of the transistor T3A, a control terminal of the transistor T3A, and an output terminal 923A_3. A control terminal of the transistor T5A is coupled to the offset control circuit 9225A. A second terminal of the transistor T5A is coupled to the output terminal 923A_1. A first terminal of the transistor T3A is coupled to the operating voltage VDD. The second terminal of the transistor T3A is coupled to the control terminal of the transistor T3A, the first terminal of the transistor T5A, and the output terminal 923A_3. A first terminal of the transistor T4A is coupled to the operating voltage VDD. A second terminal of the transistor T4A is coupled to a control terminal of the transistor T4A, a first terminal of the transistor T6A, and an output terminal 923A_4.

In the embodiment, the first signal 902A_1 and the second signal 902A_2 may be current signals. In some embodiments, at least one of the transistors T1A to T6A may respectively have different analog offset errors due to process errors, but the disclosure is not limited thereto. In the embodiment, the offset control circuits 9225A and 9226A may respectively be preset to output fixed offset control signals to control the degrees of conduction of the transistors T5A and T6A (for example, current flowing through the transistors T5A and T6A is 1.1 times or 0.9 times of the first signal 902A_1 and the second signal 902A_2, but the disclosure is not limited thereto), so that additional adjustable analog offset errors may be respectively provided.

In the embodiment, the first signal 902A_1 flows through the transistors T1A, T3A, and T5A and is converted into a conversion signal with an analog offset error. The conversion signal may be output to the output terminals 923A_1 and 923A_3. The second signal 902A_2 flows through the transistors T2A, T4A, and T6A and is converted into another conversion signal with an analog offset error. The conversion signal may be output to the output terminals 923A_2 and 923A_4. To sum up, the output terminals 923A_1 to 923A_4 may output a conversion result with an analog offset error to a back-end comparator (such as outputting the conversion result with the analog offset error the comparator 8227 of FIG. 8), so that the back-end comparator may perform an operation to generate de-identification data.

Please refer to 9B. An amplifier circuit may be implemented as the circuit architecture shown in FIG. 9B. In the embodiment, the amplifier circuit 920B includes a signal conversion circuit 921B and a signal computing circuit 922B. The signal conversion circuit 921B includes a signal conversion unit 9211B and a signal conversion unit 9212B, and the signal conversion units 9211B and 9212B include de-identification sub-circuits 9213B and 9214B. The signal computing circuit 922B includes de-identification sub-circuits 9221B and 9222B, de-identification offset circuits 9223B and 9224B, and offset control circuits 9225B and 9226B. The de-identification sub-circuits 9213B, 9214B, 9221B, and 9222B and the de-identification offset circuits 9223B and 9224B include transistors T1B to T6B.

Reference may be made to the content described in the embodiment of FIG. 9A for the circuit structure of the amplifier circuit 920B. More specifically, reference may be made to the signal conversion circuit 921A and the signal computing circuit 922A described in FIG. 9A for the architectures of the signal conversion circuit 921B and the signal computing circuit 922B, and similar content will not be described again.

In the embodiment, a control terminal of the transistor T1B may receive a clamping voltage Vc1B. A second terminal of the transistor T1B may receive a first signal 902B_1 of accumulated data. A control terminal of the transistor T2B may receive a clamping voltage Vc2B. A second terminal of the transistor T2B may receive a second signal 902B_2 of accumulated data.

In some embodiments, the first signal 902B_1 and the second signal 902B_2 may be current signals. At least one of the transistors T1B to T6B may respectively have different analog offset errors due to process errors, but the disclosure is not limited thereto. It is worth noting that the amplifier circuit 920B in this embodiment differs from the embodiment in FIG. 9A in that the offset control circuit 9225B may also receive a obfuscated code 903B to output a corresponding offset control signal to control the transistor T5B, and the offset control circuit 9226B may also receive a obfuscated code 904B to output a corresponding offset control signal to control the transistor T6B, so that additional analog offset errors may be respectively provided.

In the embodiment, the first signal 902B_1 flows through the transistors T1B, T3B, and T5B and is converted into a conversion signal with an analog offset error, and is output to output terminals 923B_1 and 923B_3. The second signal 902B_2 flows through the transistors T2B, T4B, and T6B and is converted into another conversion signal with an analog offset error, and is output to output terminals 923B_2 and 923B_4. To sum up, the output terminals 923B_1 to 923B_4 may output a conversion result with an analog offset error to a back-end comparator (such as outputting the conversion result to the comparator 8227 of FIG. 8), so that the back-end comparator may perform an operation to generate identification data. More specifically, through controlling the obfuscated codes 903B and 904B to influence the transistors T5B and T6B, the output terminals 923B_1 to 923B_4 output a differential signal of the conversion result with a sufficient privacy level in response to the additional analog offset error. In other words, in the disclosure, an adjustable analog offset error may be generated through controlling the obfuscated codes 903B and 904B to further control the output terminals 923B_1 to 923B_4 to output the conversion result with the sufficient privacy level.

Figure 9B:
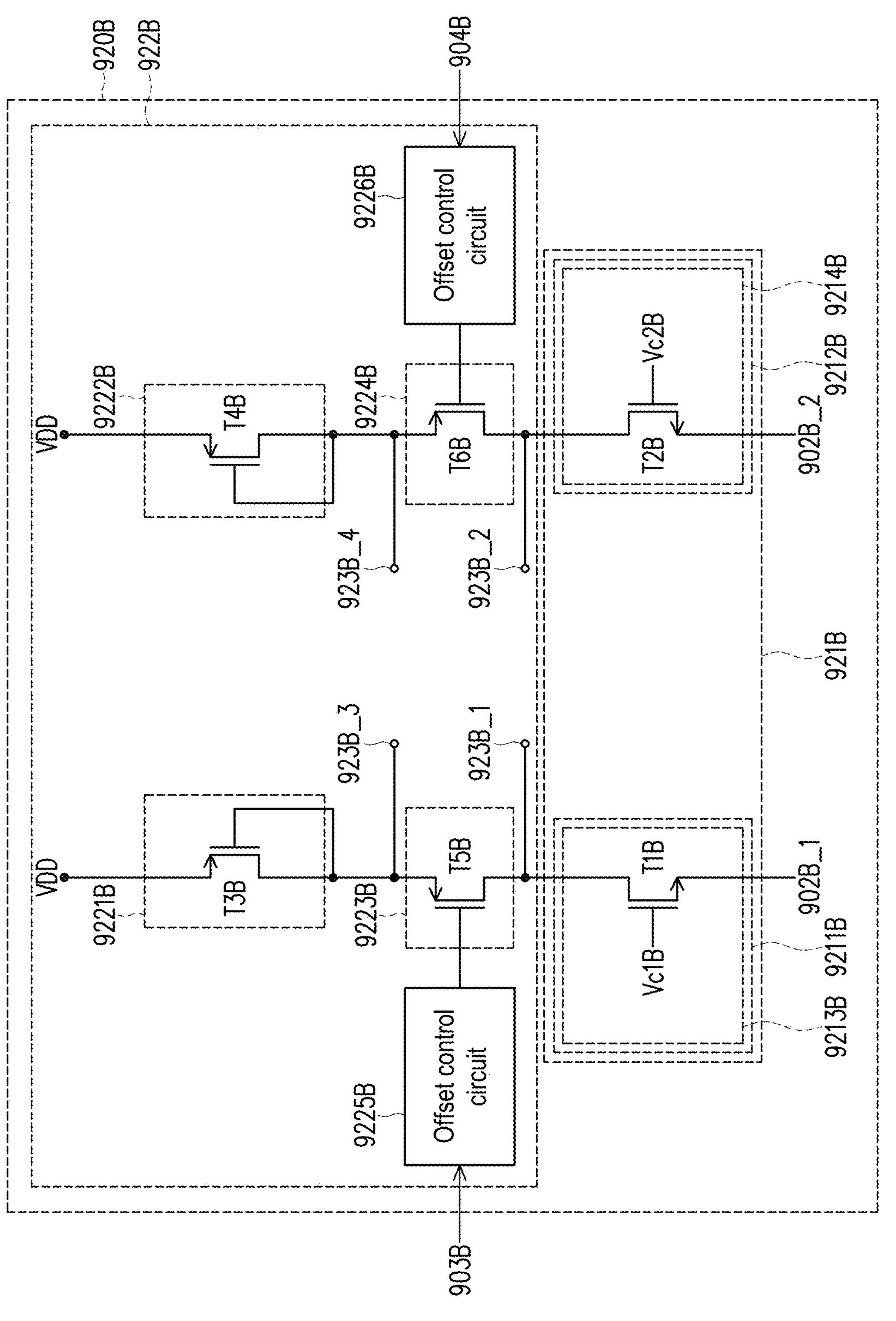
Figure 9C:
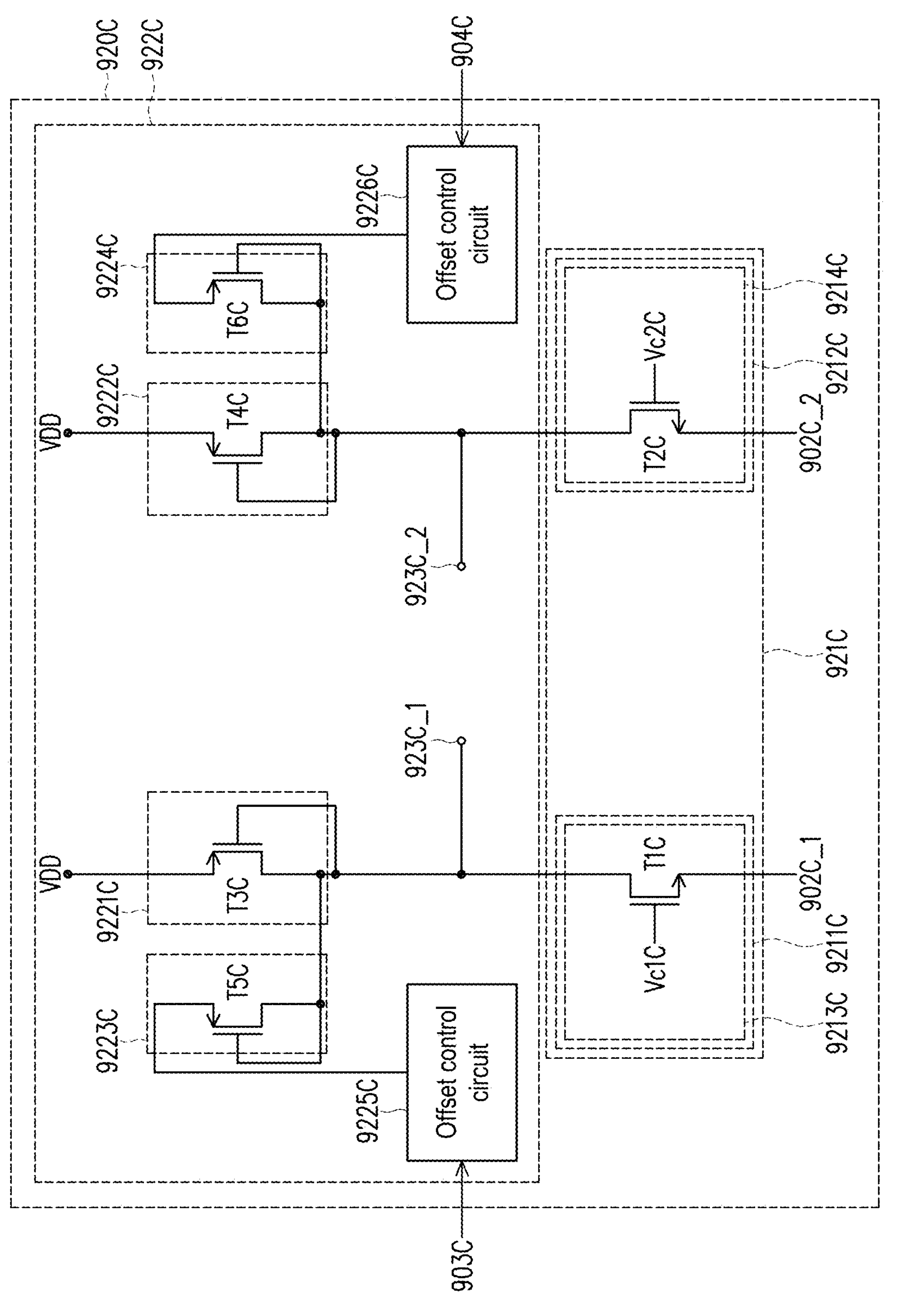

Please refer to FIG. 9C. An amplifier circuit may be implemented as the circuit architecture shown in FIG. 9C. In the embodiment, the amplifier circuit 920C includes a signal conversion circuit 921C and a signal computing circuit 922C. The signal conversion circuit 921C includes a signal conversion unit 9211C and a signal conversion unit 9212C. The signal conversion units 9211C and 9212C include de-identification sub-circuits 9213C and 9214C. The signal computing circuit 922C includes de-identification sub-circuits 9221C and 9222C, de-identification offset circuits 9223C and 9224C, and offset control circuits 9225C and 9226C. In the embodiment, the de-identification sub-circuits 9213C, 9214C, 9221C, and 9222C and the de-identification offset circuits 9223C and 9224C include transistors T1C to T6C. In some embodiments, the transistors T1C and T2C may be N type transistors, and the transistors T3C, T4C, T5C, and T6C may be P type transistors, but the disclosure is not limited thereto, and the design may be adjusted according to actual requirements.

Reference may be made to the content described in the embodiment of FIG. 9A and FIG. 9B for the circuit structure of the amplifier circuit 920C. More specifically, reference may be made to the signal conversion circuits 921A and 921B and the signal computing circuits 922A and 922B described in FIG. 9A and FIG. 9B for the architectures of the signal conversion circuit 921C and the signal computing circuit 922C, and similar content will not be described again. In the embodiment, the transistor T5C is connected in parallel with the transistor T3C of the de-identification sub-circuit 9221C, and the transistor T6C is connected in parallel with the transistor T4C of the de-identification sub-circuit 9222C, but the disclosure is not limited thereto. It is worth noting that the amplifier circuit 920C in this embodiment differs from the embodiments in FIG. 9A and FIG. 9B in that a first terminal of the transistor T1C is coupled to a second terminal of the transistor T3C, a control terminal of the transistor T3C, a second terminal of the transistor T5C, a control terminal of the transistor T5C, and an output terminal 923C_1. A control terminal of the transistor T1C may receive a clamping voltage Vc1C. A second terminal of the transistor T1C may receive a first signal 902C_1 of accumulated data. A first terminal of the transistor T2C is coupled to a second terminal of the transistor T4C, a control terminal of the transistor T4C, a second terminal of the transistor T6C, a control terminal of the transistor T6C, and an output terminal 923C_2. The control terminal of the transistor T2C may receive a clamping voltage Vc2C. The second terminal of the transistor T2C may receive a second signal 902C_2 of accumulated data. A first terminal of the transistor T3C may be coupled to the operating voltage VDD. A first terminal of the transistor T4C may be coupled to the operating voltage VDD. A first terminal of the transistor T5C may be coupled to the offset control circuit 9225C. The control terminal of the transistor T5C is coupled to the second terminal of the transistor T5C. The second terminal of the transistor T5C is also coupled to the output terminal 923C_1. The second terminal of the transistor T3C is coupled to the control terminal of the transistor T3C, the second terminal of the transistor T5C, the control terminal of the transistor T5C, and the output terminal 923C_1. A first terminal of the transistor T6C may be coupled to the offset control circuit 9226C. The control terminal of the transistor T6C is coupled to the second terminal of the transistor T6C. The second terminal of the transistor T6C is also coupled to the output terminal 923C_2. The second terminal of the transistor T4C is coupled to the control terminal of the transistor T4C, the second terminal of the transistor T6C, the control terminal of the transistor T6C, and the output terminal 923C_2.

In some embodiments, the first signal 902C_1 and the second signal 902C_2 may be current signals. At least one of the transistors T1C to T6C may respectively have different analog offset errors due to process errors, but the disclosure is not limited thereto. In some embodiments, the offset control circuit 9225C may also receive an obfuscated code 903C to output a corresponding offset control signal to control the transistor T5C, and the offset control circuit 9226C may also receive an obfuscated code 904C to output a corresponding offset control signal to control the transistor T6C, so that additional analog offset errors may be respectively provided.

In the embodiment, the first signal 902C_1 flows through the transistors T1C, T3C, and T5C and is converted into a conversion signal with an analog offset error. The conversion signal may be output to the output terminal 923C_1. The second signal 902C_2 flows through the transistors T2C, T4C, and T6C and is converted into another conversion signal with an analog offset error. The conversion signal may be output to the output terminal 923C_2. To sum up, the output terminals 923C_1 and 923C_2 may output a conversion result with an analog offset error to a back-end comparator (such as outputting the conversion result to the comparator 8227 of FIG. 8), so that the back-end comparator may perform an operation to generate identification data. More specifically, through controlling the obfuscated codes 903C and 904C to influence the transistors T5C and T6C, the output terminals 923C_1 and 923C_2 output a differential signal of the conversion result with a sufficient privacy level in response to the additional analog offset error. In other words, in the disclosure, an adjustable analog offset error may be generated through controlling the obfuscated codes 903C and 904C to further control the output terminals 923C_1 and 923C_2 to output the conversion result with the sufficient privacy level.

Figure 9D:
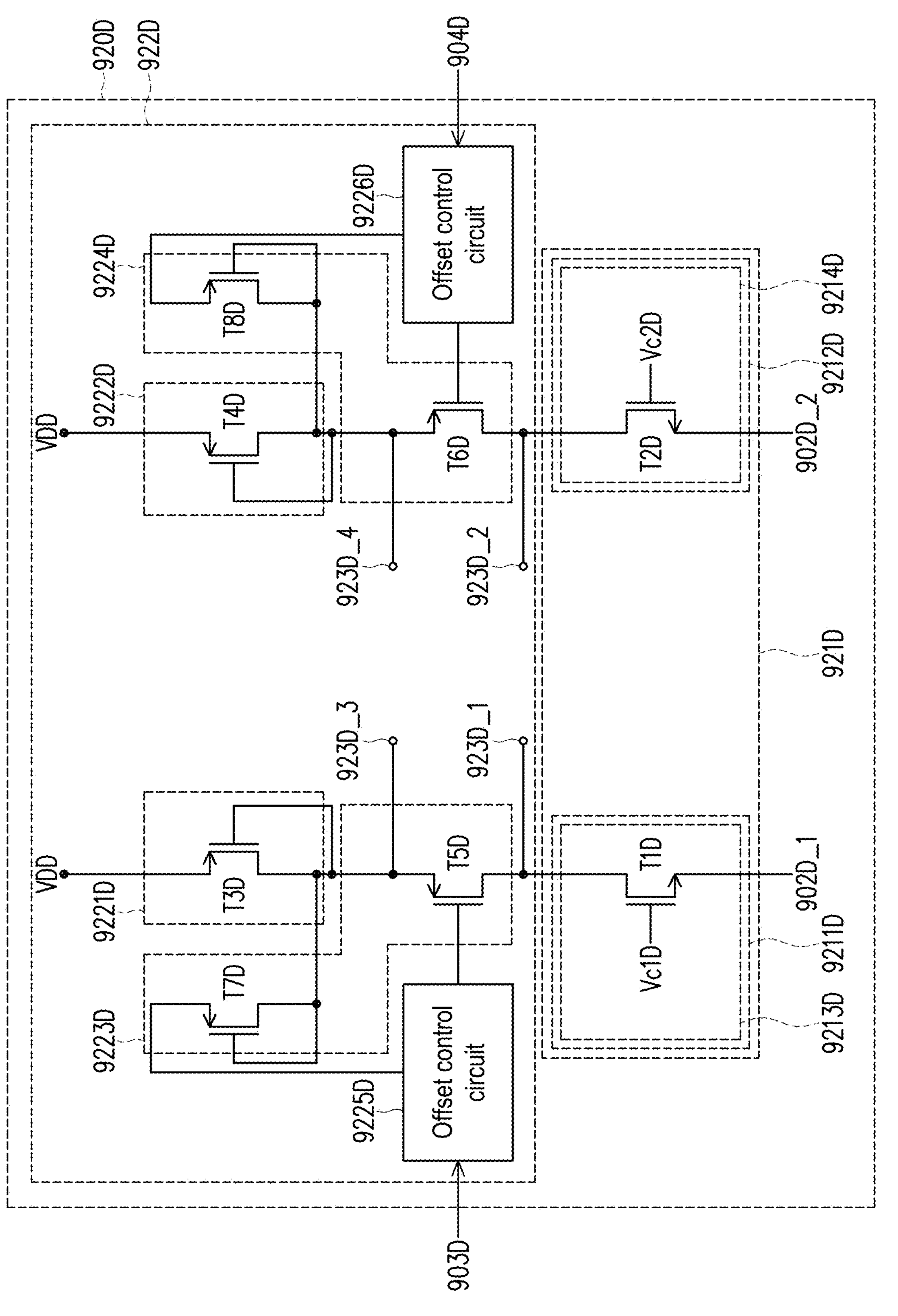

Please refer to FIG. 9D. An amplifier circuit may be implemented as the circuit architecture shown in FIG. 9D. In the embodiment, the amplifier circuit 920D includes a signal conversion circuit 921D and a signal computing circuit 922D. The signal conversion circuit 921D includes a signal conversion unit 9211D and a signal conversion unit 9212D. The signal conversion units 9211D and 9212D include de-identification sub-circuits 9213D and 9214D. The signal computing circuit 922D includes de-identification sub-circuits 9221D and 9222D, de-identification offset circuits 9223D and 9224D, and offset control circuits 9225D and 9226D. The de-identification sub-circuits 9213D, 9214D, 9221D, and 9222D include transistors T1D to T4D. The de-identification offset circuit 9223D includes transistors T5D and T7D. The de-identification offset circuit 9224D includes transistors T6D and T8D. In some embodiments, the transistors T1D and T2D may be N type transistors, and the transistors T3D, T4D, T5D, T6D, T7D, and T8D may be P type transistors, but the disclosure is not limited thereto, and the design may be adjusted according to actual requirements.

Reference may be made to the content described in the embodiments of FIG. 9A to FIG. 9C for the circuit structure of the amplifier circuit 920D. More specifically, reference may be made to the signal conversion circuits 921A-921C and the signal computing circuits 922A-922C described in FIG. 9A for the architectures of the transistors T1D to T6D of the signal conversion circuit 921D and the signal computing circuit 922D, and similar content will not be described again. It is worth noting that the transistor T5D is connected in series between the transistor T1D of the de-identification sub-circuit 9213D and the transistor T3D of the de-identification sub-circuit 9221D. The transistor T6D is connected in series between the transistor T2D of the de-identification sub-circuit 9214D and the transistor T4D of the de-identification sub-circuit 9222D. Wherein, the circuit structure of transistors T3D, T4D, T7D, and T8D is similar to the transistors T3C to T6C in FIG. 9C. The transistor T7D is connected in parallel with the transistor T3D of the de-identification sub-circuit 9221D, and the transistor T8D is connected in parallel with the transistor T4D of the de-identification sub-circuit 9222D. In the embodiment, a first terminal of the transistor T7D is coupled to the offset control circuit 9225D. A control terminal of the transistor T7D is coupled to a second terminal of the transistor T7D. The second terminal of the transistor T7D is also coupled to an output terminal 923D_3. A first terminal of the transistor T8D is coupled to the offset control circuit 9226D. A control terminal of the transistor T8D is coupled to a second terminal of the transistor T8D. The second terminal of the transistor T8D is also coupled to an output terminal 923D_4

In the embodiment, a control terminal of the transistor T1D may receive a clamping voltage Vc1D. A second terminal of the transistor T1D may receive a first signal 902D_1 of accumulated data. A control terminal of the transistor T2D may receive a clamping voltage Vc2D. A second terminal of the transistor T2D may receive a second signal 902D_2 of accumulated data.

In some embodiments, the first signal 902D_1 and the second signal 902D_2 may be current signals. At least one of the transistors T1D to T8D may respectively have different analog offset errors due to process errors, but the disclosure is not limited thereto. In some embodiments, the offset control circuit 9225D may receive an obfuscated code 903D to output the same or different offset control signals to control the transistors T5D and T7D, and the offset control circuit 9226D may receive an obfuscated code 904D to output the same or different offset control signal to control the transistors T6D and T8D, so that additional analog offset errors may be respectively provided.

In the embodiment, the first signal 902D_1 flows through the transistors T1D, T3D, T5D, and T7D and is converted into a conversion signal with an analog offset error, and is output to the output terminals 923D_1 and 923D_3. The second signal 902D_2 flows through the transistors T2D, T4D, T6D, and T8D and is converted into another conversion signal with an analog offset error, and is output to the output terminals 923D_2 and 923D_4. To sum up, the output terminals 923D_1 to 923D_4 may output a conversion result with an analog offset error to a back-end comparator (such as outputting the conversion result to the comparator 8227 of FIG. 8), so that the back-end comparator may perform an operation to generate identification data. More specifically, through controlling the obfuscated codes 903D and 904D to influence the transistor T5D to T8D, the output terminals 923D_1 to 923D_4 output a differential signal of the conversion result with a sufficient privacy level in response to the additional analog offset error. In other words, in the disclosure, an adjustable analog offset error may be generated through controlling the obfuscated codes 903D and 904D to further control the output terminals 923D_1 to 923D_4 to output the conversion result with the sufficient privacy level.

Figure 9E:
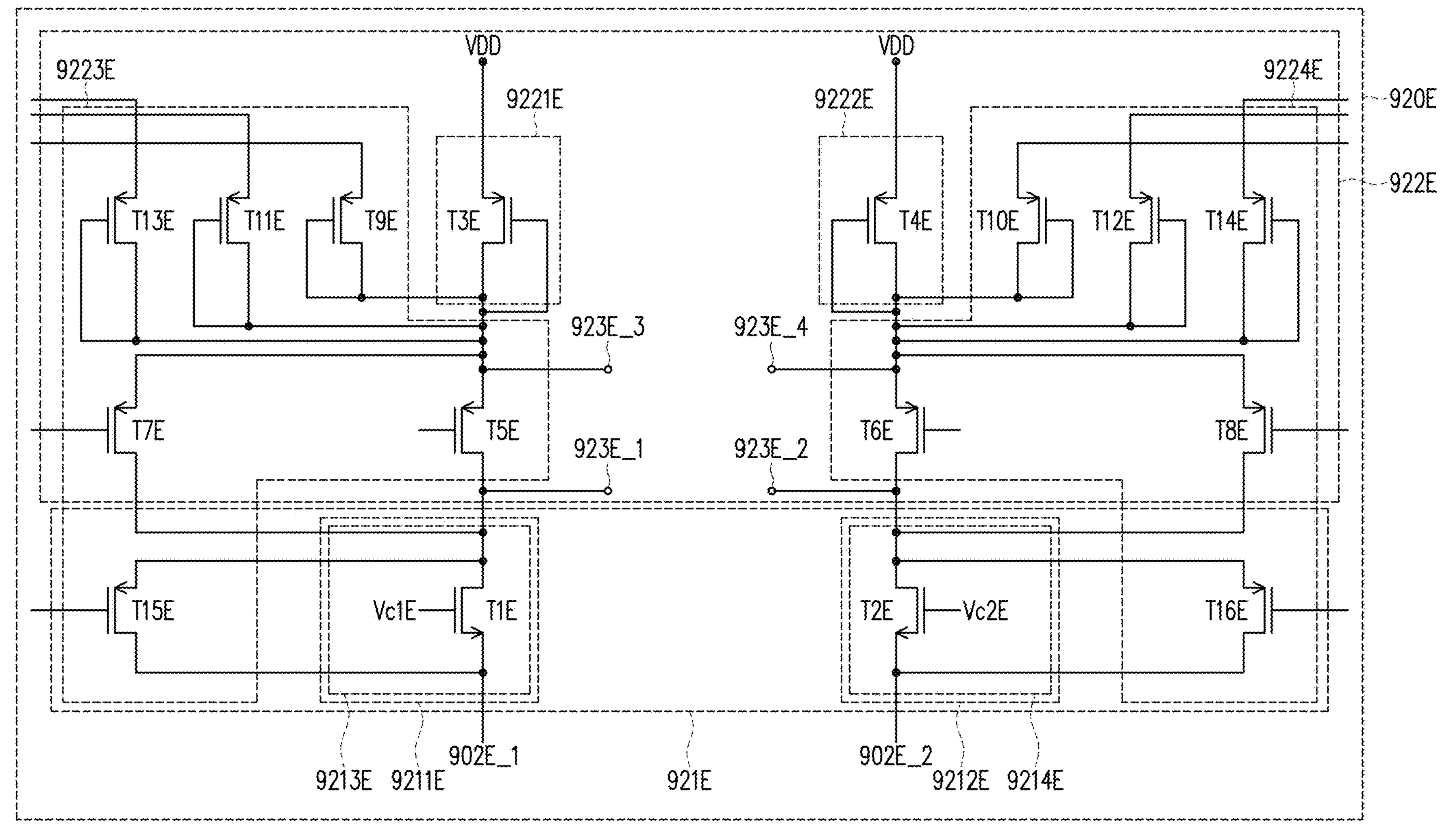

Please refer to FIG. 9E. An amplifier circuit may be implemented as the circuit architecture of a differential amplifier shown in FIG. 9E. In the embodiment, the amplifier circuit 920E includes a signal conversion circuit 921E and a signal computing circuit 922E. The signal conversion circuit 921E includes a signal conversion unit 9211E, a signal conversion unit 9212E, and transistors T15E and T16E of de-identification offset circuits 9223E and 9224E. The signal conversion units 9211E and 9212E include de-identification sub-circuits 9213E and 9214E. The signal computing circuit 922E includes de-identification sub-circuits 9221E and 9222E, transistors T3E to T14E of the de-identification offset circuits 9223E and 9224E, and an offset control circuit (not shown). The de-identification sub-circuits 9213E, 9214E, 9221E, and 9222E include transistors T1E to T4E. The de-identification offset circuit 9223E includes transistors T5E, T7E, T9E, T11E, T13E, and T15E, wherein the transistor T15E in the embodiment is designed in the signal conversion circuit 921E. The de-identification offset circuit 9224E includes transistors T6E, T8E, T10E, T12E, T14E, and T16E, wherein the transistor T16E in the embodiment is designed in the signal conversion circuit 921E, but the transistors of the disclosure are not limited thereto. In some embodiments, the transistor T1E and the transistor T2E are N type transistors, and the transistors T3E to T16E are P type transistors, but the disclosure is not limited thereto, and the design may be adjusted according to actual requirements.

Reference may be made to the content described in the embodiments of FIG. 9A to FIG. 9D for the circuit structure of the amplifier circuit 920E. More specifically, reference may be made to the signal conversion circuits 921A-921D and the signal computing circuits 922A-922D described in FIG. 9A for the architectures of the transistors T1E to T6E of the signal conversion circuit 921E and the signal computing circuit 922E, and similar content will not be described again. It is worth noting that the transistors T1E, T3E, and T5E are connected in series. The transistors T2E, T4E, and T6E are connected in series. The transistor T5E is connected in parallel with the transistor T7E. The transistor T6E is connected in parallel with the transistor T8E. The transistor T15E is connected in parallel with the transistor T1E. The transistor T16E is connected in parallel with the transistor T2E. The transistor T3E, the transistor T9E, the transistor T11E, and the transistor T13E are connected in parallel. The transistor T4E, the transistor T10E, the transistor T12E, and the transistor T14E are connected in parallel. Control terminals of the transistors T9E to T14E are respectively coupled to respective second terminals. In some embodiments, control terminals of the transistors T5E to T8E, T15E, and T16E and first terminals of the transistors T9E to T14E may be coupled to the same or different offset control circuits (not shown).

In the embodiment, a control terminal of the transistor T1E may receive a clamping voltage Vc1E. A control terminal of the transistor T2E may receive a clamping voltage Vc2E. Wherein, the circuit structure of transistors T3E, T4E, T9E to T14E is similar to the transistors T3D, T4D, T7D, and T8D in FIG. 9D. It is worth noting that the amplifier circuit 920E in this embodiment differs from the embodiments in FIG. 9A to FIG. 9D in that the first terminals of transistors T3E, T4E, T9E to T14E are all coupled to an offset control circuit (not shown). The control terminals of transistors T3E, T4E, T9E to T14E are each coupled to their respective second terminals. The second terminals of transistors T3E, T9E, T11E, and T13E are further coupled to output terminal 923E_3 and the first terminals of transistors T5E and T7E. The second terminals of transistors T4E, T10E, T12E, and T14E are further coupled to output terminal 923E_4 and the first terminals of transistors T6E and T8E. The control terminals of transistors T5E to T8E are coupled to an offset control circuit (not shown). The second terminals of transistors T5E and T7E are further coupled to output terminal 923E_1 and the first terminals of transistors T1E and T15E. The second terminals of transistors T6E and T8E are further coupled to output terminal 923E_2 and the first terminals of transistors T2E and T16E. The control terminals of transistors T15E and T16E are coupled to an offset control circuit (not shown). The second terminals of transistors T1E and T15E can receive the first signal 902E_1 of the accumulated data. The second terminals of transistors T2E and T16E can receive the second signal 902E_2 of the accumulated data.

In some embodiments, the first signal 902E_1 and the second signal 902E_2 may be current signals. At least one of the transistors T1E to T16E may respectively have different analog offset errors due to process errors, but the disclosure is not limited thereto. In some embodiments, the offset control circuit (not shown) of the amplifier circuit 920E may also receive an obfuscated code to output the same or different offset control signals to control the transistors T5E to T14E, so that additional analog offset errors may be respectively provided.

In the embodiment, the first signal 902E_1 flows through the transistors T1E, T3E, T5E, T7E, T9E, T11E, T13E, and T15E and is converted into a conversion signal with an analog offset error. The conversion signal may be output to the output terminals 923E_1 and 923E_3. The second signal 902E_2 flows through the transistors T2E, T4E, T6E, T8E, T10E, T12E, T14E, and T16E and is converted into another conversion signal with an analog offset error. The conversion signal may be output to the output terminals 923E_2 and 923E_4. To sum up, the output terminals 923E_1 to 923E_4 may output a conversion result with an analog offset error to a back-end comparator (such as outputting the conversion result to the comparator 8227 of FIG. 8), so that the back-end comparator may perform an operation to generate identification data. In some embodiments, the transistors T5E to T16E may also be influenced through receiving the obfuscated code (not shown), and the output terminals 923E_1 to 923E_4 output a differential signal of the conversion result with a sufficient privacy level in response to the additional analog offset error. In other words, in the disclosure, an adjustable analog offset error may be generated through controlling the obfuscated code to further control the output terminals 923E_1 to 923E_4 to output the conversion result with the sufficient privacy level.

Figure 9F:
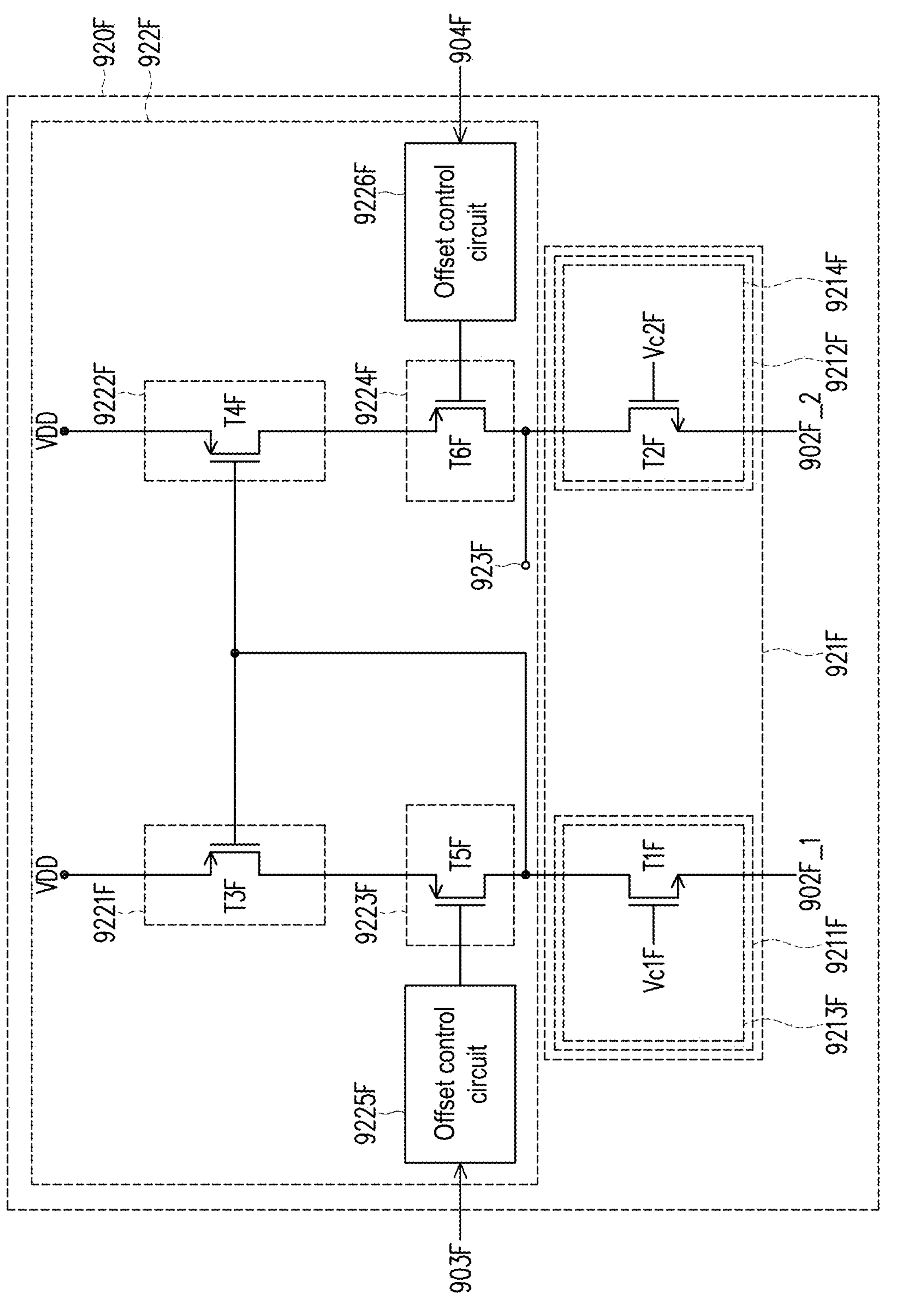

Please refer to FIG. 9F. An amplifier circuit may be implemented as the circuit architecture shown in FIG. 9F. In the embodiment, the amplifier circuit 920F includes a signal conversion circuit 921F and a signal computing circuit 922F. The signal conversion circuit 921F includes a signal conversion unit 9211F and a signal conversion unit 9212F. The signal conversion units 9211F and 9212F include de-identification sub-circuits 9213F and 9214F. The signal computing circuit 922F includes de-identification sub-circuits 9221F and 9222F, de-identification offset circuits 9223F and 9224F, and offset control circuits 9225F and 9226F. The de-identification sub-circuits 9213F, 9214F, 9221F, and 9222F include transistors T1F to T4F. The de-identification offset circuit 9223F includes a transistor T5F. The de-identification offset circuit 9224F includes a transistor T6F. In some embodiments, the transistor T1F and the transistor T2F are N type transistors, and the transistors T3F, T4F, T5F, and T6F are P type transistors, but the disclosure is not limited thereto, and the design may be adjusted according to actual requirements.

In the embodiment, the transistor T5F is connected in series between the transistor T1F of the de-identification sub-circuit 9213F and the transistor T3F of the de-identification sub-circuit 9221F. The transistor T6F is connected in series between the transistor T2F of the de-identification sub-circuit 9214F and the transistor T4F of the de-identification sub-circuit 9222F.

It is worth noting that in the embodiment, a first terminal of the transistor T1F is coupled to a second terminal of the transistor T5F and control terminals of the transistors T3F and T4F. A control terminal of the transistor T1F may receive a clamping voltage Vc1F. A second terminal of the transistor T1F may receive a first signal 902F_1 of accumulated data. A first terminal of the transistor T2F is coupled to a second terminal of the transistor T6F and an output terminal 923F. A control terminal of the transistor T2F may receive a clamping voltage Vc2F. A second terminal of the transistor T2F may receive a second signal 902F_2 of accumulated data. A first terminal of the transistor T5F is coupled to a second terminal of the transistor T3F. A control terminal of the transistor T5F is coupled to the offset control circuit 9225F. A second terminal of the transistor T5F is coupled to the first terminal of the transistor T1F and control terminals of the transistors T3F and T4F. A first terminal of the transistor T3F may be coupled to the operating voltage VDD. The second terminal of the transistor T3F is coupled to the first terminal of the transistor T5F. A first terminal of the transistor T4F may be coupled to the operating voltage VDD. A second terminal of the transistor T4F is coupled to a first terminal of the transistor T6F. The first terminal of the transistor T6F is coupled to the second terminal of the transistor T4F. A control terminal of the transistor T6F is coupled to the offset control circuit 9226F.

In some embodiments, the first signal 902F_1 and the second signal 902F_2 may be current signals. At least one of the transistors T1F to T6F may respectively have different analog offset errors due to process errors, but the disclosure is not limited thereto. In some embodiments, the offset control circuit 9225F may also receive an obfuscated code 903F to output a corresponding offset control signal to control the transistor T5F, and the offset control circuit 9226F may also receive an obfuscated code 904F to output a corresponding offset control signal to control the transistor T6F, so that additional analog offset errors may be respectively provided.

In the embodiment, the first signal 902F_1 flows through the transistors T1F, T3F, and T5F and is converted into a conversion signal with an analog offset error. The second signal 902F_2 flows through the transistors T2F, T4F, and T6F and is converted into another conversion signal with an analog offset error. To sum up, the output terminal 923F may output a voltage signal of the conversion result with the analog offset error (that is, a result of subtracting the conversion signal from another conversion signal) to a back-end comparator (such as outputting the conversion result to the comparator 8227 of FIG. 8), so that the back-end comparator may perform an operation to generate de-identification data. More specifically, through controlling the obfuscated codes 903F and 904F to influence the transistors T5F and T6F, the output terminal 923F outputs the conversion result with a sufficient privacy level in response to the additional analog offset error. In other words, in the disclosure, an adjustable analog offset error may be generated through controlling the obfuscated codes 903F and 904F to further control the output terminal 923F to output the conversion result with the sufficient privacy level.

Figure 9G:
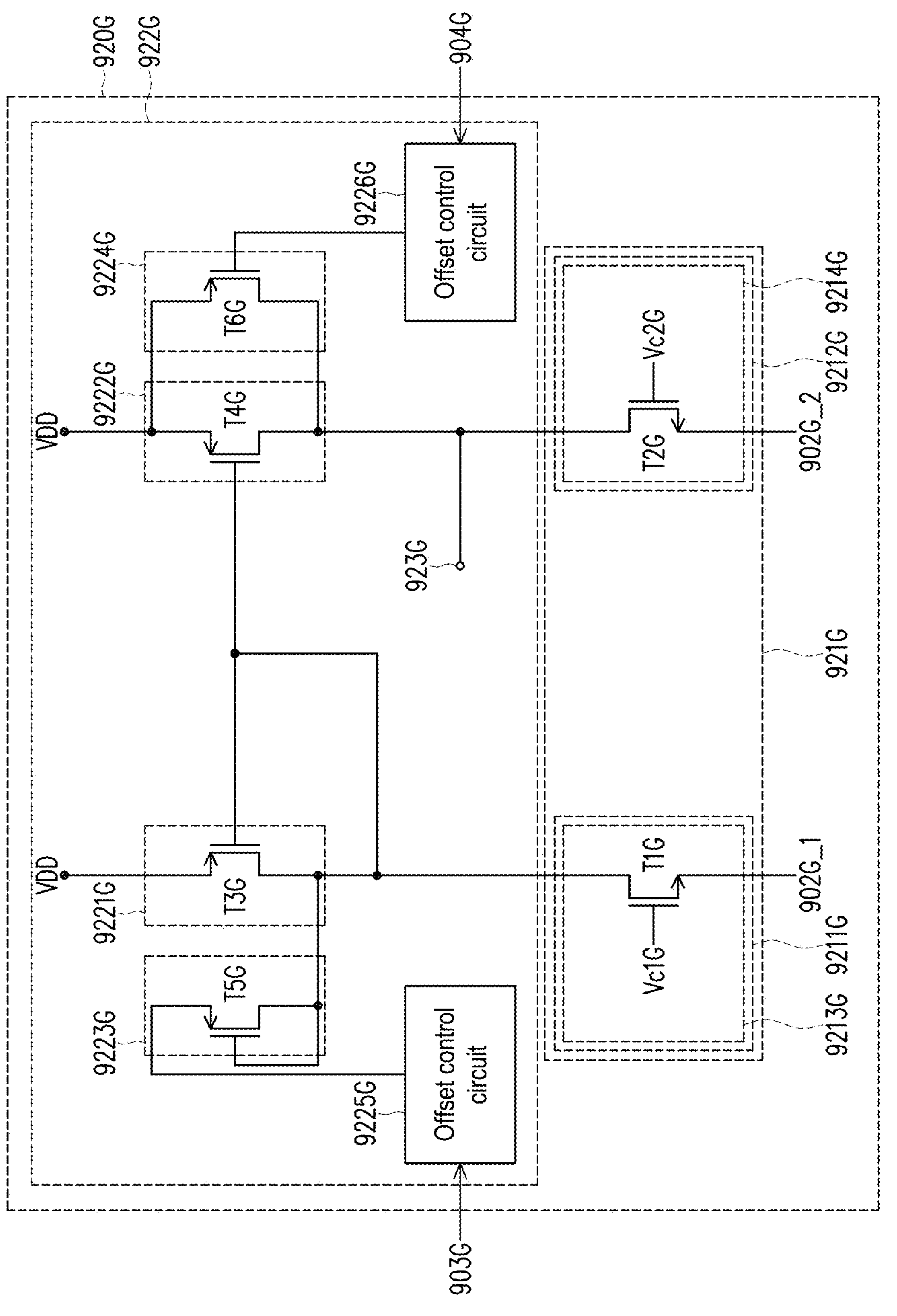

Please refer to FIG. 9G. An amplifier circuit may be implemented as the circuit architecture shown in FIG. 9G. In the embodiment, the amplifier circuit 920G includes a signal conversion circuit 921G and a signal computing circuit 922G. The signal conversion circuit 921G includes a signal conversion unit 9211G and a signal conversion unit 9212G. The signal conversion units 9211G and 9212G include de-identification sub-circuits 9213G and 9214G. The signal computing circuit 922G includes de-identification sub-circuits 9221G and 9222G, de-identification offset circuits 9223G and 9224G, and offset control circuits 9225G and 9226G. In the embodiment, the de-identification sub-circuits 9213G, 9214G, 9221G, and 9222G and the de-identification offset circuits 9223G and 9224G include transistors T1G to T6G. In some embodiments, the transistor T1G and the transistor T2G may be N type transistors, and the transistors T3G, T4G, T5G, and T6G may be P type transistors, but the disclosure is not limited thereto, and the design may be adjusted according to actual requirements.

Reference may be made to the content described in the embodiment of FIG. 9F for the circuit structure of the amplifier circuit 920G. More specifically, reference may be made to the signal conversion circuit 921F and the signal computing circuit 922F described in FIG. 9F for the architectures of the transistors T1G to T4G of the signal conversion circuit 921G and the signal computing circuit 922G, and similar content will not be described again. In the embodiment, the transistor T5G is connected in parallel with the transistor T3G of the de-identification sub-circuit 9221G, and the transistor T6G is connected in parallel with the transistor T4G of the de-identification sub-circuit 9222G, but the disclosure is not limited thereto. It is worth noting that the amplifier circuit 920G in this embodiment differs from the embodiment in FIG. 9F in that a first terminal of the transistor T1G is coupled to a second terminal of the transistor T3G, control terminals of the transistors T3G and T4G, and a control terminal and a second terminal of the transistor T5G. A first terminal of the transistor T2G is coupled to a second terminal of the transistor T4G, a second terminal of the transistor T6G, and an output terminal 923G. A first terminal of the transistor T5G is coupled to the offset control circuit 9225G. A first terminal of the transistor T6G is coupled to the operating voltage VDD and a first terminal of the transistor T4G. A control terminal of the transistor T6G is coupled to the offset control circuit 9226G. A second terminal of the transistor T6G is coupled to the output terminal 923G and the second terminal of the transistor T4G.

In some embodiments, the first signal 902G_1 and the second signal 902G_2 may be current signals. At least one of the transistors T1G to T6G may respectively have different analog offset errors due to process errors, but the disclosure is not limited thereto. In some embodiments, the offset control circuit 9225G may receive an obfuscated code 903G to output a corresponding offset control signal to control the transistor T5G, and the offset control circuit 9226G may receive an obfuscated code 904G to output a corresponding offset control signal to control the transistor T6G, so that additional analog offset errors may be respectively provided.

In the embodiment, the first signal 902G_1 flows through the transistors T1G, T3G, and T5G and is converted into a conversion signal with an analog offset error. The second signal 902G_2 flows through the transistors T2G, T4G, and T6G and is converted into another conversion signal with an analog offset error. To sum up, the output terminal 923G may output a voltage signal of the conversion result with the analog offset error (that is, a result of subtracting the conversion signal from another conversion signal) to a back-end comparator (such as outputting the conversion result to the comparator 8227 of FIG. 8), so that the back-end comparator may perform an operation to generate de-identification data. More specifically, through controlling the obfuscated codes 903G and 904G to influence the transistors T5G and T6G, the output terminal 923G outputs the conversion result with a sufficient privacy level in response to the additional analog offset error. In other words, in the disclosure, an adjustable analog offset error may be generated through controlling the obfuscated codes 903G and 904G to further control the output terminal 923G to output the conversion result with the sufficient privacy level.

Figure 9H:
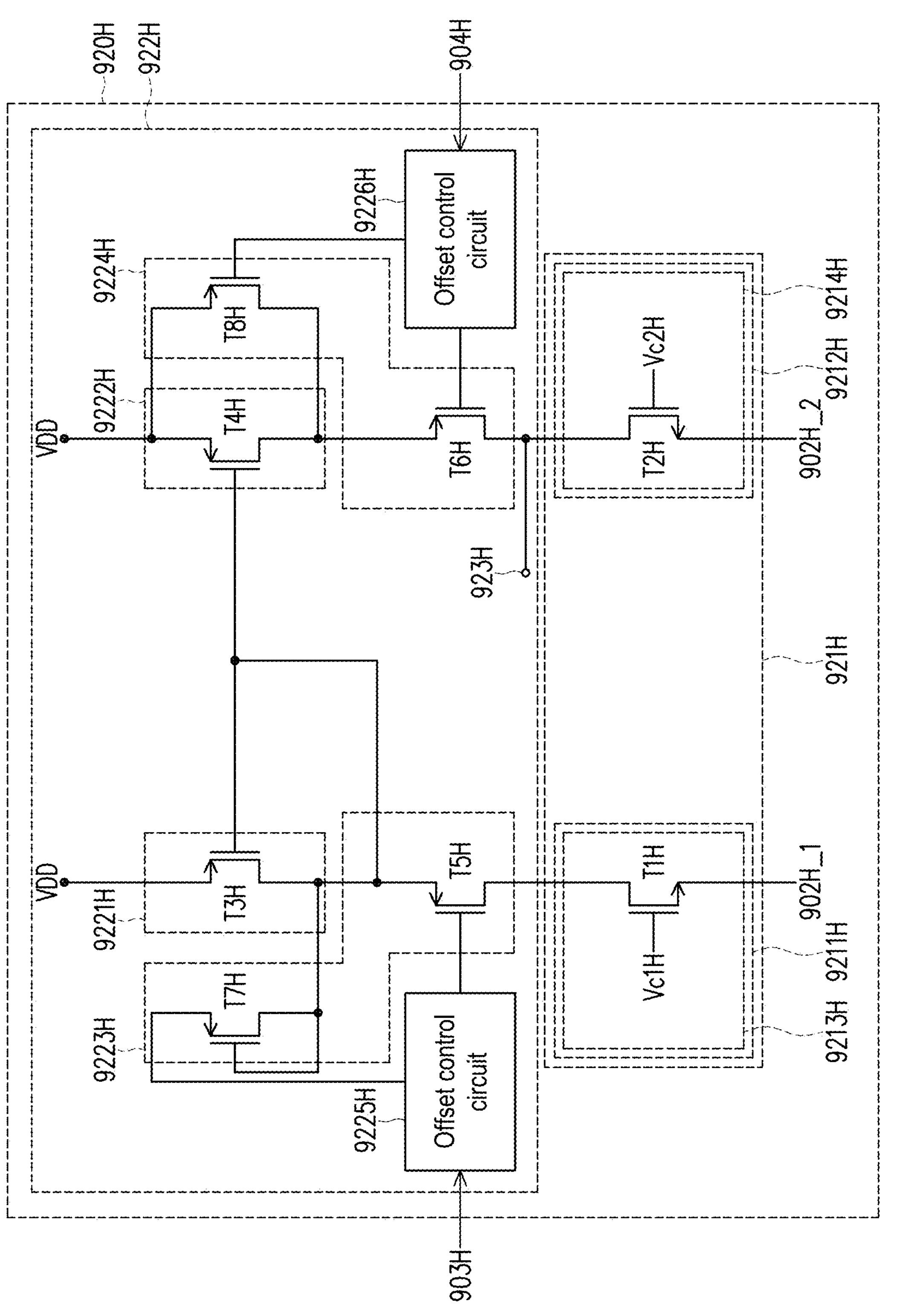

Please refer to FIG. 9H. An amplifier circuit may be implemented as the circuit architecture shown in FIG. 9H. In the embodiment, the amplifier circuit 920H includes a signal conversion circuit 921H and a signal computing circuit 922H. The signal conversion circuit 921H includes a signal conversion unit 9211H and a signal conversion unit 9212H. The signal conversion units 9211H and 9212H include de-identification sub-circuits 9213H and 9214H. The signal computing circuit 922H includes de-identification sub-circuits 9221H and 9222H, de-identification offset circuits 9223H and 9224H, and offset control circuits 9225H and 9226H. In the embodiment, the de-identification sub-circuits 9213H, 9214H, 9221H, and 9222H include transistors T1H to T4H. The de-identification offset circuit 9223H includes transistors T5H and T7H. The de-identification offset circuit 9224H includes transistors T6H and T8H. In some embodiments, the transistors T1H and T2H are N type transistors, and the transistors T3H, T4H, T5H, T6H, T7H, and T8H are P type transistors, but the disclosure is not limited thereto, and the design may be adjusted according to actual requirements.

Reference may be made to the content described in the embodiments of FIG. 9F and FIG. 9G for the circuit structure of the amplifier circuit 920H. More specifically, reference may be made to the signal conversion circuits 921F and 921G and the signal computing circuits 922F and 922G described in FIG. 9F and FIG. 9G for the architectures of the transistors T1H to T6H of the signal conversion circuit 921H and the signal computing circuit 922H, and similar content will not be described again. It is worth noting that the transistor T5H is connected in series between the transistor T1H of the de-identification sub-circuit 9213H and the transistor T3H of the de-identification sub-circuit 9221H. The transistor T6H is connected in series between the transistor T2H of the de-identification sub-circuit 9214H and the transistor T4H of the de-identification sub-circuit 9222H. The transistor T7H is connected in parallel with the transistor T3H of the de-identification sub-circuit 9221H, and the transistor T8H is connected in parallel with the transistor T4H of the de-identification sub-circuit 9222H.

In the embodiment, a control terminal of the transistor T1H may receive a clamping voltage Vc1H. A second terminal of the transistor T1H may receive a first signal 902H_1 of accumulated data. A control terminal of the transistor T2H may receive a clamping voltage Vc2H. A second terminal of the transistor T2H may receive a second signal 902H_2 of accumulated data. It is worth noting that the amplifier circuit 920H in this embodiment differs from the embodiments in FIG. 9F and FIG. 9G in that a first terminal of the transistor T5H is coupled to the second terminal of the transistor T3H, the control terminals of the transistors T3H, T4H, and T7H and the second terminal of the transistor T7H. A control terminal of the transistor T5H and a first terminal of the transistor T7H are coupled to the offset control circuit 9225H. The second terminal of the transistor T5H is coupled to the first terminal of the transistor T1H. The first terminal of the transistor T6H is coupled to the second terminals of the transistors T4H and T8H. The control terminals of the transistors T6H and T8H are coupled to the offset control circuit 9226H. The second terminal of the transistor T6H is coupled to the first terminal of the transistor T2H and the output terminal 923H. The first terminal of the transistor T4H is coupled to the operating voltage VDD. The second terminal of the transistor T4H is coupled to the first terminal of the transistor T6H and the second terminal of the transistor T8H.

In some embodiments, the first signal 902H_1 and the second signal 902H_2 may be current signals. At least one of the transistors T1H to T8H may respectively have different analog offset errors due to process errors, but the disclosure is not limited thereto. In some embodiments, the offset control circuit 9225H may also receive an obfuscated code 903H to output the same or different offset control signals to control the transistors T5H and T7H, and the offset control circuit 9226H may also receive an obfuscated code 904H to output the same or different offset control signals to control the transistors T6H and T8H, so that additional analog offset errors may be respectively provided.

In the embodiment, the first signal 902H_1 flows through the transistors T1H, T3H, T5H, and T7H and is converted into a conversion signal with an analog offset error. The second signal 902H_2 flows through the transistors T2H, T4H, T6H, and T8H and is converted into another conversion signal with an analog offset error. To sum up, the output terminal 923H may output a voltage signal of the conversion result with the analog offset error (that is, a result of subtracting the conversion signal from another conversion signal) to a back-end comparator (such as outputting the conversion result to the comparator 8227 of FIG. 8), so that the back-end comparator may perform an operation to generate de-identification data. More specifically, through controlling the obfuscated codes 903H and 904H to influence the transistors T5H to T8H, the output terminal 923H outputs the conversion result with a sufficient privacy level in response to the additional analog offset error. In other words, in the disclosure, an adjustable analog offset error may be generated through controlling the obfuscated codes 903H and 904H to further control the output terminal 923H to output the conversion result with the sufficient privacy level.

Figure 9I:
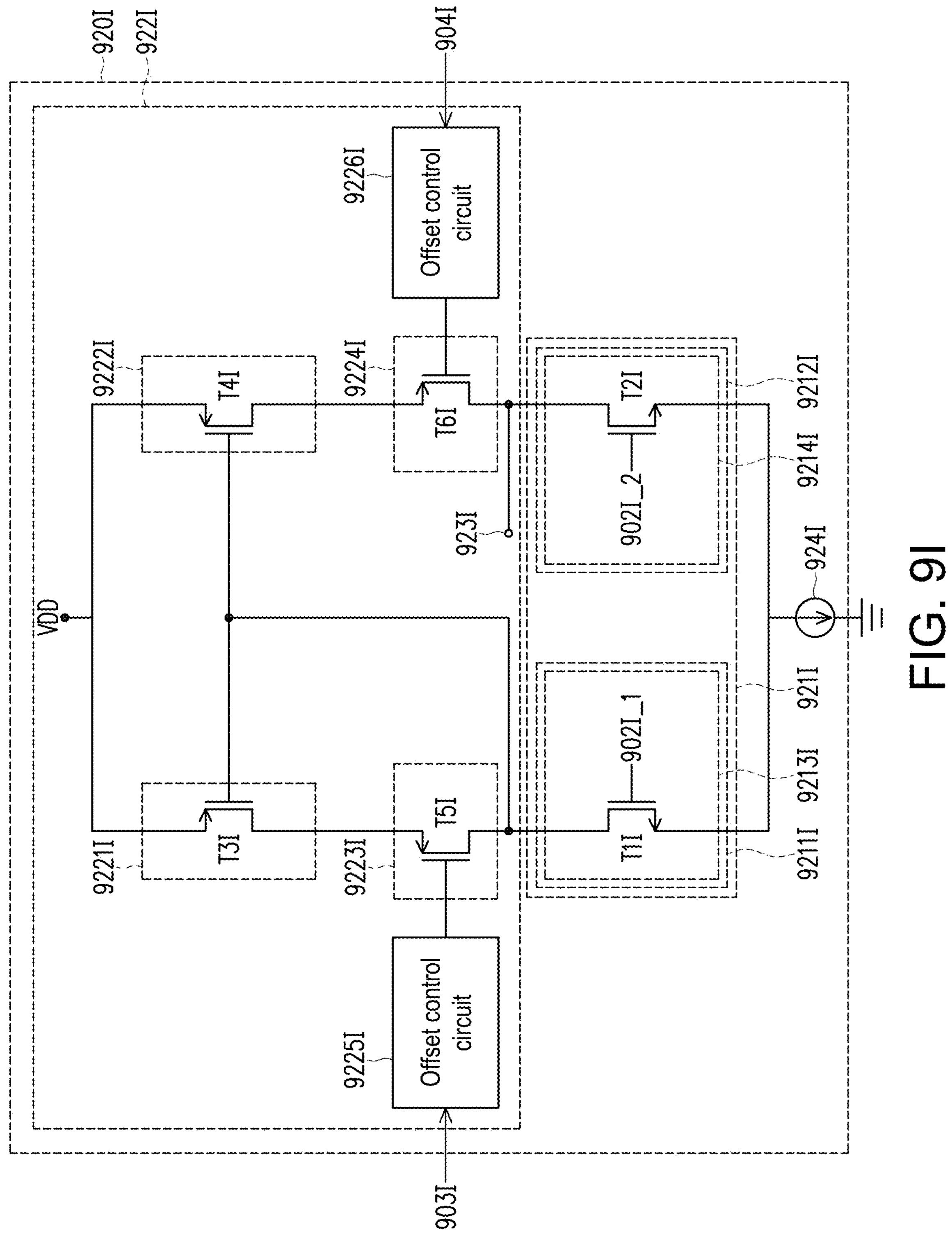

Please refer to FIG. 9I. An amplifier circuit may be implemented as the circuit architecture shown in FIG. 9I. In the embodiment, the amplifier circuit 920I includes a signal conversion circuit 921I, a signal computing circuit 922I, and a reference current source 924I. The signal conversion circuit 921I includes a signal conversion unit 9211I and a signal conversion unit 9212I. The signal conversion units 9211I and 9212I include de-identification sub-circuits 9213I and 9214I. The signal computing circuit 922I includes de-identification sub-circuits 9221I and 9222I, de-identification offset circuits 9223I and 9224I, and offset control circuits 9225I and 9226I. In the embodiment, the de-identification sub-circuits 9213I, 9214I, 9221I, and 9222I include transistors T1I to T4I. The de-identification offset circuits 9223I, 9224I include transistors T5I and T6I. In some embodiments, the transistors T1I and T2I are N type transistors, and the transistors T3I, T4I, T5I, and T6I are P type transistors, but the disclosure is not limited thereto, and the design may be adjusted according to actual requirements.

In the embodiment, the transistor T5I is connected in series between the transistor T1I of the de-identification sub-circuit 9213I and the transistor T3I of the de-identification sub-circuit 9221I. The transistor T6I is connected in series between the transistor T2I of the de-identification sub-circuit 9214I and the transistor T4I of the de-identification sub-circuit 9222I.

In the embodiment, a control terminal of the transistor T1I may receive a first signal 902I_1 of accumulated data. A second terminal of the transistor T1I may be coupled to the reference current source 924I. A first terminal of the transistor T2I is coupled to a second terminal of the transistor T6I and an output terminal 923I. A control terminal of the transistor T2I may receive a second signal 902I_2 of accumulated data. A second terminal of the transistor T2I is coupled to the reference current source 924I. A first terminal of the transistor T5I is coupled to a second terminal of the transistor T3I. A control terminal of the transistor T5I is coupled to the offset control circuit 9225I. A second terminal of the transistor T5I is coupled to a first terminal of the transistor T1I, a control terminal of the transistor T3I, and a control terminal of the transistor T4I. A first terminal of the transistor T3I is coupled to the operating voltage VDD. The second terminal of the transistor T3I is coupled to the first terminal of the transistor T5I. A first terminal of the transistor T4I is coupled to the operating voltage VDD. A second terminal of the transistor T4I is coupled to a first terminal of the transistor T6I.

In some embodiments, the first signal 902I_1 and the second signal 902I_2 may be voltage signals. At least one of the transistors T1I to T6I may respectively have different analog offset errors due to process errors, but the disclosure is not limited thereto. In some embodiments, the offset control circuit 9225I may also receive an obfuscated code 903I to output a corresponding offset control signal to control the transistor T5I, and the offset control circuit 9226I may also receive an obfuscated code 904I to output a corresponding offset control signal to control the transistor T6I, so that additional analog offset errors may be respectively provided.

In the embodiment, the transistor T1I is controlled via the first signal 902I_1 to determine a current signal flowing through the transistor T1I, and the current signal flows through the transistors T1I, T3I, and T5I and is converted into a conversion signal with an analog offset error. The transistor T2I is controlled via the second signal 902I_2 to determine another current signal flowing through the transistor T2I, and the other current signal flows through the transistors T2I, T4I, and T6I and is converted into another conversion signal with an analog offset error. To sum up, the output terminal 923I may output a voltage signal of the conversion result with the analog offset error (that is, a result of subtracting the conversion signal from another conversion signal) to a back-end comparator (such as outputting the conversion result to the comparator 8227 of FIG. 8), so that the back-end comparator may perform an operation to generate de-identification data. More specifically, through controlling the obfuscated codes 903I and 904I to influence the transistors T5I and T6I, the output terminal 923I outputs the conversion result with a sufficient privacy level in response to the additional analog offset error. In other words, in the disclosure, an adjustable analog offset error may be generated through controlling the obfuscated codes 903I and 904I to further control the output terminal 923I to output the conversion result with the sufficient privacy level.

Figure 9J:
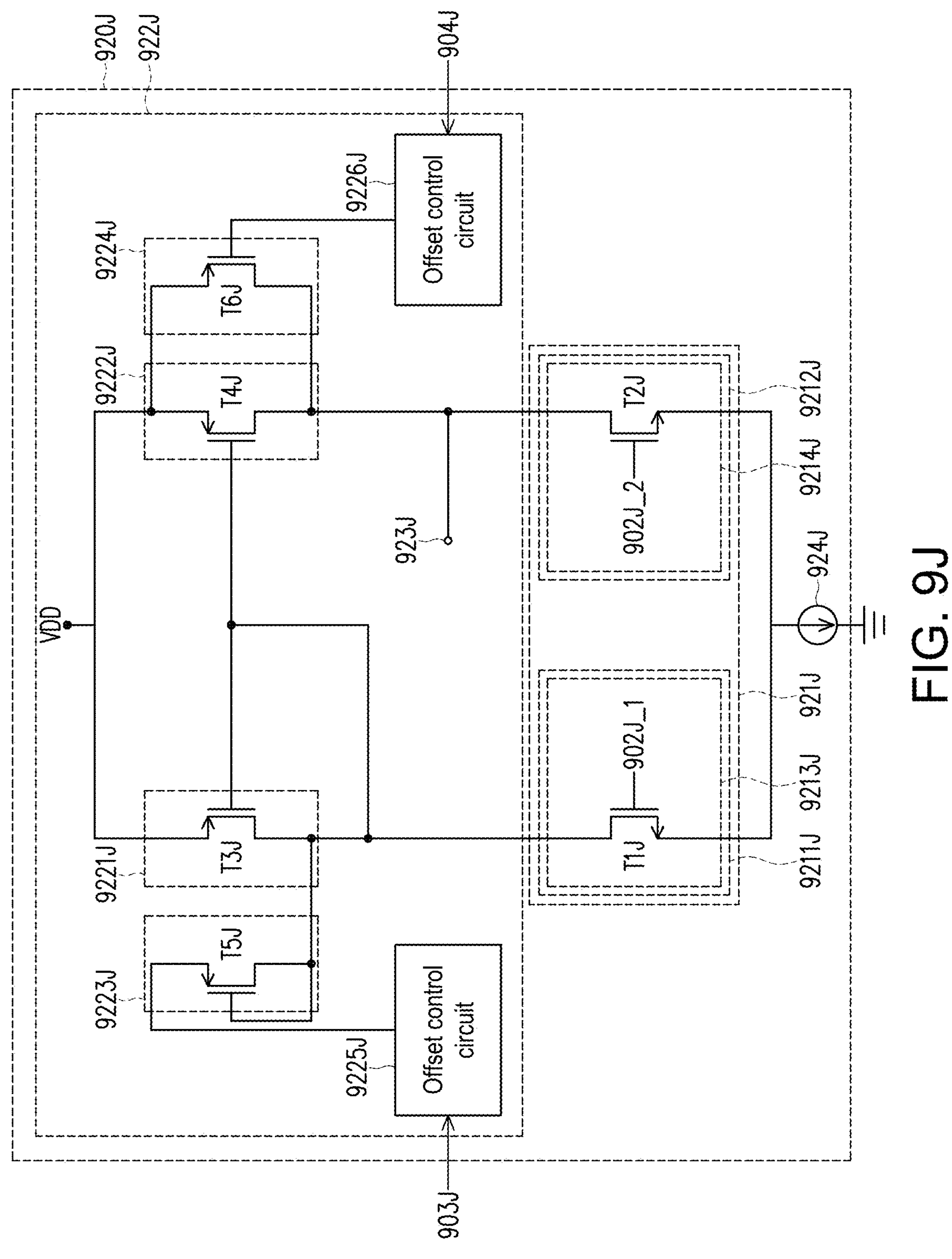

Please refer to FIG. 9J. An amplifier circuit may be implemented as the circuit architecture shown in FIG. 9J. In the embodiment, the amplifier circuit 920J includes a signal conversion circuit 921J, a signal computing circuit 922J, and a reference current source 924J. The signal conversion circuit 921J includes a signal conversion unit 9211J and a signal conversion unit 9212J. The signal conversion units 9211J and 9212J include de-identification sub-circuits 9213J and 9214J. The signal computing circuit 922J includes de-identification sub-circuits 9221J and 9222J, de-identification offset circuits 9223J and 9224J, and offset control circuits 9225J and 9226J. In the embodiment, the de-identification sub-circuits 9213J, 9214J, 9221J, and 9222J include transistors T1J to T4J. The de-identification offset circuits 9223J and 9224J include transistors T5J and T6J. In some embodiments, the transistors T1J and T2J are N type transistors, and the transistors T3J, T4J, T5J, and T6J are P type transistors, but the disclosure is not limited thereto, and the design may be adjusted according to actual requirements.

Reference may be made to the content described in the embodiment of FIG. 9I for the circuit structure of the amplifier circuit 920J. More specifically, reference may be made to the signal conversion circuit 921I and the signal computing circuit 922I described in FIG. 9I for the architectures of the transistors T1I to T4I of the signal conversion circuit 921I and the signal computing circuit 922I, and similar content will not be described again. In the embodiment, the transistor T5J is connected in parallel with the transistor T3J of the de-identification sub-circuit 9221J, and the transistor T6J is connected in parallel with the transistor T4J of the de-identification sub-circuit 9222J.

It is worth noting that the amplifier circuit 920J in this embodiment differs from the embodiment in FIG. 9I in that the first terminal of the transistor T1J is coupled to the second terminal of the transistor T3J, the control terminals of the transistors T3J, T4J, and T5J and the second terminal of the transistor T5J. A first terminal of the transistor T2J is coupled to a second terminal of the transistor T4J, a second terminal of the transistor T6J, and an output terminal 923J. A first terminal of the transistor T5J is coupled to the offset control circuit 9225J. A first terminal of the transistor T6J is coupled to the operating voltage VDD and a first terminal of the transistor T4J. A control terminal of the transistor T6J is coupled to the offset control circuit 9226J.

In some embodiments, the first signal 902J_1 and the second signal 902J_2 may be voltage signals. At least one of the transistors T1J to T4J may respectively have different analog offset errors due to process errors, but the disclosure is not limited thereto. In some embodiments, the offset control circuit 9225J may also receive an obfuscated code 903J to output a corresponding offset control signal to control the transistor T5J, and the offset control circuit 9226J may also receive an obfuscated code 904J to output a corresponding offset control signal to control the transistor T6J, so that additional analog offset errors may be respectively provided.

In the embodiment, the transistor T1I is controlled via the first signal 902I_1 to determine a current signal flowing through the transistor T1I, and the current signal flows through the transistors T1J, T3J, and T5J and is converted into a conversion signal with an analog offset error. The transistor T2J is controlled via the second signal 902J_2 to determine another current signal flowing through the transistor T2J, and the other current signal flows through the transistors T2J, T4J, and T6J and is converted into another conversion signal with an analog offset error. To sum up, the output terminal 923J may output a voltage signal of the conversion result with the analog offset error (that is, a result of subtracting the conversion signal from another conversion signal) to a back-end comparator (such as outputting the conversion result to the comparator 8227 of FIG. 8), so that the back-end comparator may perform an operation to generate de-identification data. More specifically, through controlling the obfuscated codes 903J and 904J to influence the transistors T5J and T6J, the output terminal 923J outputs the conversion result with a sufficient privacy level in response to the additional analog offset error. In other words, in the disclosure, an adjustable analog offset error may be generated through controlling the obfuscated codes 903J and 904J to further control the output terminal 923J to output the conversion result with the sufficient privacy level.

Figure 9K:
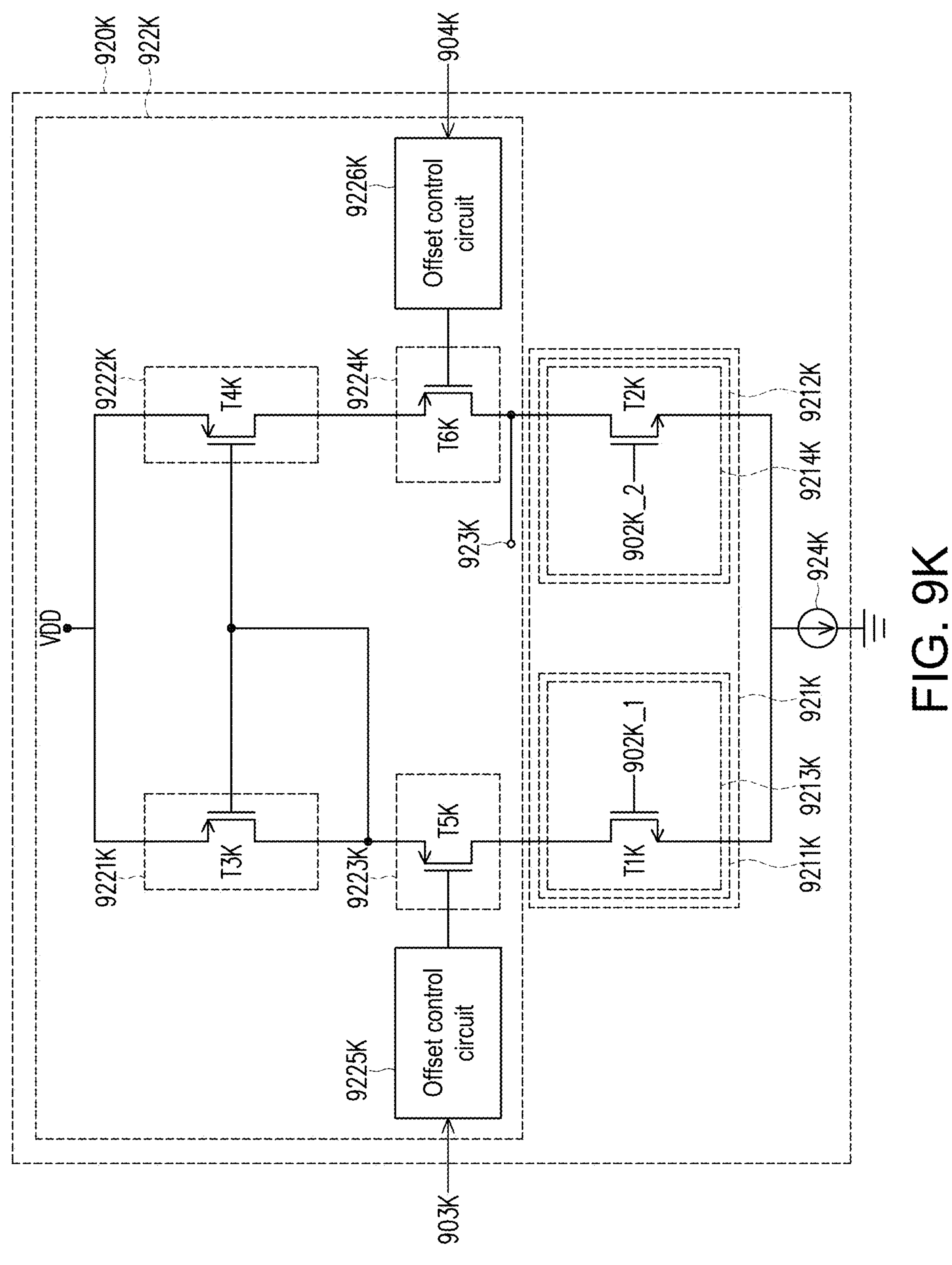

Please refer to FIG. 9K. An amplifier circuit of each embodiment of the disclosure may be implemented as the circuit architecture shown in FIG. 9K. In the embodiment, the amplifier circuit 920K includes a signal conversion circuit 921K, a signal computing circuit 922K, and a reference current source 924K. The signal conversion circuit 921K includes a signal conversion unit 9211K and a signal conversion unit 9212K. The signal conversion units 9211K and 9212K include de-identification sub-circuits 9213K and 9214K. The signal computing circuit 922K includes de-identification sub-circuits 9221K and 9222K, de-identification offset circuits 9223K and 9224K, and offset control circuits 9225K and 9226K.

In the embodiment, the de-identification sub-circuits 9213K, 9214K, 9221K, and 9222K include transistors T1K to T4K. The de-identification offset circuits 9223K and 9224K include transistors T5K and T6K. In some embodiments, the transistors T1K and T2K are N type transistors, and the transistors T3K, T4K, T5K, and T6K are P type transistors, but the disclosure is not limited thereto, and the design may be adjusted according to actual requirements.

Reference may be made to the content described in the embodiments of FIG. 9I and FIG. 9J for the circuit structure of the amplifier circuit 920K. More specifically, reference may be made to the signal conversion circuits 921I and 921J and the signal computing circuits 922I and 922J described in FIG. 9I and FIG. 9J for the architectures of the transistors T1K to T6K of the signal conversion circuit 921K and the signal computing circuit 922K, and similar content will not be described again. In the embodiment, the transistor T5K is connected in series between the transistor T1K of the de-identification sub-circuit 9213K and the transistor T3K of the de-identification sub-circuit 9221K. The transistor T6K is connected in series between the transistor T2K of the de-identification sub-circuit 9214K and the transistor T4K of the de-identification sub-circuit 9222K.

It is worth noting that the amplifier circuit 920K in this embodiment differs from the embodiments in FIG. 9I and FIG. 9J in that a first terminal of the transistor T1K is coupled to a second terminal of the transistor T5K. A first terminal of the transistor T5K is coupled to a second terminal of the transistor T3K, a control terminal of the transistor T3K, and a control terminal of the transistor T4K. The second terminal of the transistor T5K is coupled to the first terminal of the transistor T1K.

In some embodiments, the first signal 902K_1 and the second signal 902K_2 may be voltage signals. At least one of the transistors T1K to T6K may respectively have different analog offset errors due to process errors, but the disclosure is not limited thereto. In some embodiments, the offset control circuit 9225K may also receive an obfuscated code 903K to output a corresponding offset control signal to control the transistor T5K, and the offset control circuit 9226K may also receive an obfuscated code 904K to output a corresponding offset control signal to control the transistor T6K, so that additional analog offset errors may be respectively provided.

In the embodiment, the transistor T1K is controlled via the first signal 902K_1 to determine a current signal flowing through the transistor T1K, and the current signal flows through the transistors T1K, T3K, and T5K and is converted into a conversion signal with an analog offset error. The transistor T2K is controlled via the second signal 902K_2 to determine another current signal flowing through the transistor T2K, and the other current signal flows through the transistors T2K, T4K, and T6K and is converted into another conversion signal with an analog offset error. To sum up, the output terminal 923K may output a voltage signal of the conversion result with the analog offset error (that is, a result of subtracting the conversion signal from another conversion signal) to a back-end comparator (such as outputting the conversion result to the comparator 8227 of FIG. 8), so that the back-end comparator may perform an operation to generate de-identification data. More specifically, through controlling the obfuscated codes 903K and 904K to influence the transistors T5K and T6K, the output terminal 923K outputs the conversion result with a sufficient privacy level in response to the additional analog offset error. In other words, in the disclosure, an adjustable analog offset error may be generated through controlling the obfuscated codes 903K and 904K to further control the output terminal 923K to output the conversion result with the sufficient privacy level.

Figure 9L:
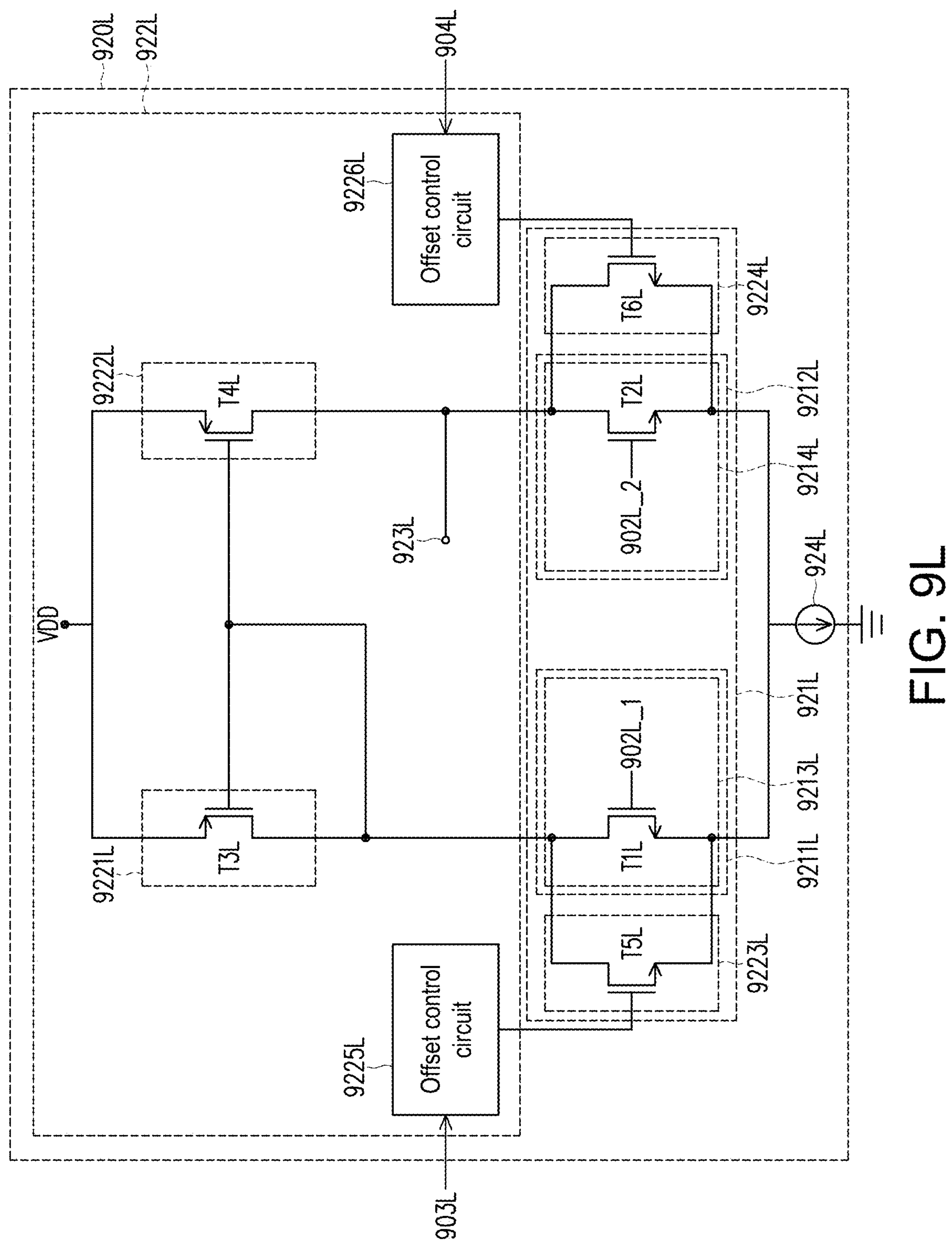

Please refer to FIG. 9L. An amplifier circuit may be implemented as the circuit architecture shown in FIG. 9L. In the embodiment, the amplifier circuit 920L includes a signal conversion circuit 921L, a signal computing circuit 922L, and a reference current source 924L. The signal conversion circuit 921L includes signal conversion units 9211L and 9212L and de-identification offset circuits 9223L and 9224L. The signal conversion units 9211L and 9212L include de-identification sub-circuits 9213L and 9214L. The signal computing circuit 922L includes de-identification sub-circuits 9221L and 9222L and offset control circuits 9225L and 9226L. In some embodiments, the offset control circuits 9225L and 9226L may also be disposed in the signal conversion circuit 921L, but the disclosure is not limited thereto.

In the embodiment, the de-identification sub-circuits 9213L, 9214L, 9221L, and 9222L include transistors T1L to T4L. The de-identification offset circuits 9223L and 9224L include transistors T5L and T6L. In some embodiments, the transistors T1L, T2L, T5L, and T6L are N type transistors, and the transistors T3L and T4L are P type transistors, but the disclosure is not limited thereto, and the design may be adjusted according to actual requirements.

Reference may be made to the content described in the embodiments of FIG. 9I to FIG. 9K for the circuit structure of the amplifier circuit 920L. More specifically, reference may be made to the signal conversion circuits 921I to 921K and the signal computing circuits 922I to 922K described in FIG. 9I to FIG. 9K for the architectures of the transistors T1L to T4L of the signal conversion circuit 921L and the signal computing circuit 922L, and similar content will not be described again. In the embodiment, the transistor T5L is connected in parallel with the transistor T1L of the de-identification sub-circuit 9211L. The transistor T6L is connected in parallel with the transistor T2L of the de-identification sub-circuit 9212L.

It is worth noting that the amplifier circuit 920L in this embodiment differs from the embodiments in FIG. 9I to FIG. 9K in that a first terminal of the transistor T1L is coupled to a first terminal of the transistor T5L, a second terminal of the transistor T3L, a control terminal of the transistor T3L, and a control terminal of the transistor T4L. A control terminal of the transistor T1L may receive a first signal 902L_1 of accumulated data. A second terminal of the transistor T1L is coupled to a second terminal of the transistor T5L and the reference current source 924L. A first terminal of the transistor T2L is coupled to a first terminal of the transistor T6L, a second terminal of the transistor T4L, and an output terminal 923L. A control terminal of the transistor T2L may receive a second signal 902L_2 of accumulated data. A second terminal of the transistor T2L is coupled to a second terminal of the transistor T6L and the reference current source 924L. A control terminal of the transistor T5L is coupled to the offset control circuit 9225L of the signal computing circuit 922L. The control terminal of the transistor T6L is coupled to the offset control circuit 9226L of the signal computing circuit 922L.

In some embodiments, the first signal 902L_1 and the second signal 902L_2 may be voltage signals. At least one of the transistors T1L to T6L may respectively have different analog offset errors due to process errors, but the disclosure is not limited thereto. In some embodiments, the offset control circuit 9225L may also receive an obfuscated code 903L to output a corresponding offset control signal to control the transistor T5L, and the offset control circuit 9226L may also receive an obfuscated code 904L to output a corresponding offset control signal to control the transistor T6L, so that additional analog offset errors may be respectively provided.

In the embodiment, the transistor T1L is controlled via the first signal 902L_1 to determine a current signal flowing through the transistor T1L, and the current signal flows through the transistors T1K, T3K, and T5K and is converted into a conversion signal with an analog offset error. The transistor T2L is controlled via the second signal 902L_2 to determine another current signal flowing through the transistor T2L, and the other current signal flows through the transistors T2K, T4K, and T6K and is converted into another conversion signal with an analog offset error. To sum up, the output terminal 923L may output a voltage signal of the conversion result with the analog offset error (that is, a result of subtracting the conversion signal from another conversion signal) to a back-end comparator (such as outputting the conversion result to the comparator 8227 of FIG. 8), so that the back-end comparator may perform an operation to generate de-identification data. More specifically, through controlling the obfuscated codes 903L and 904L to influence the transistors T5L and T6L, the output terminal 923L outputs the conversion result with a sufficient privacy level in response to the additional analog offset error. In other words, in the disclosure, an adjustable analog offset error may be generated through controlling the obfuscated codes 903L and 904L to further control the output terminal 923L to output the conversion result with the sufficient privacy level.

Figure 9M:
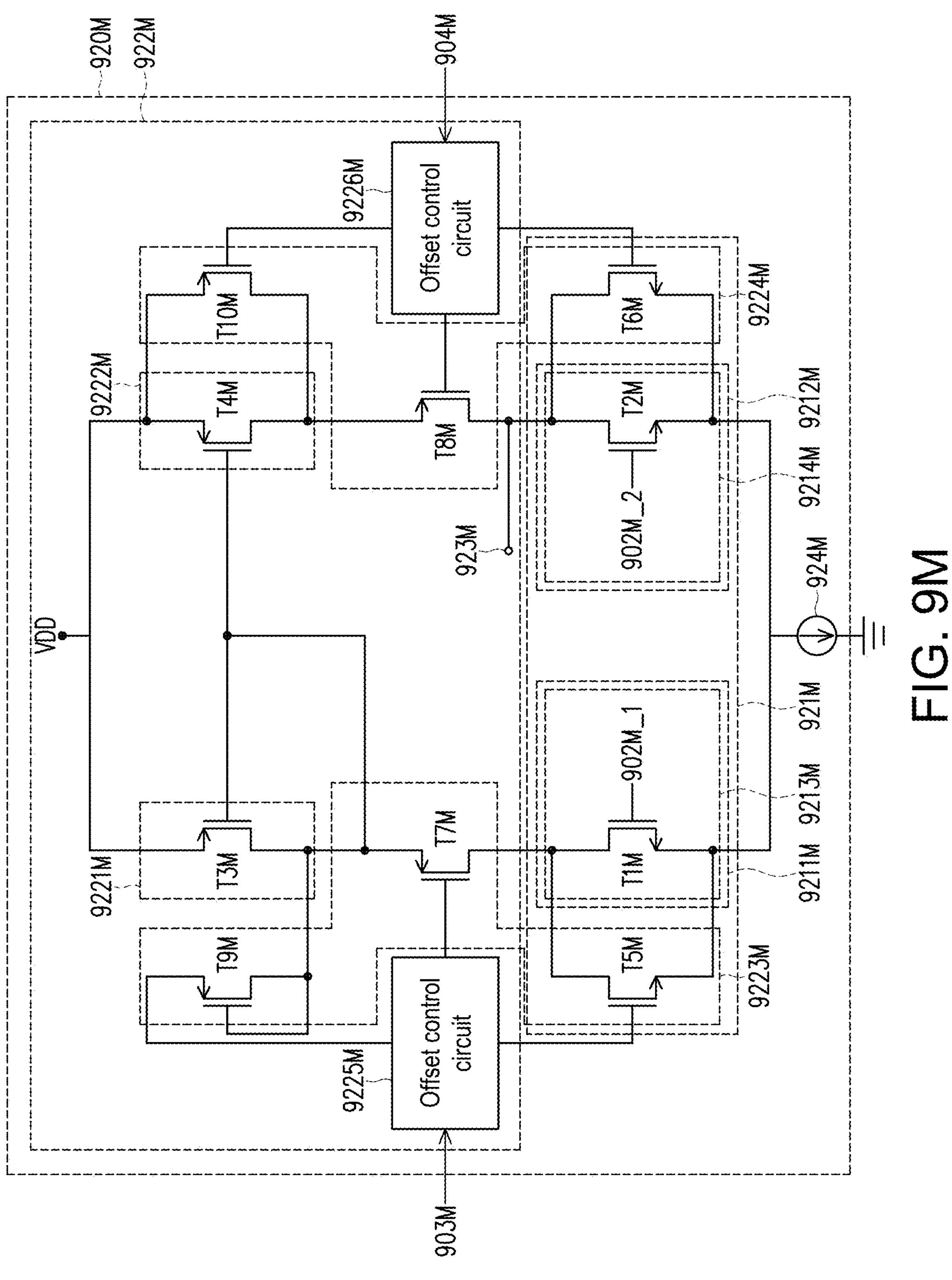

Please refer to FIG. 9M. An amplifier circuit may be implemented as the circuit architecture shown in FIG. 9M. In the embodiment, the amplifier circuit 920M includes a signal conversion circuit 921M, a signal computing circuit 922M, and a reference current source 924M. The signal conversion circuit 921M includes a signal conversion unit 9211M, a signal conversion unit 9212M, and transistors T5M and T6M of de-identification offset circuits 9223M and 9224M. The signal conversion units 9211M and 9212M include de-identification sub-circuits 9213M and 9214M. The signal computing circuit 922M includes de-identification sub-circuits 9221M and 9222M, transistors T7M to T10M of the de-identification offset circuits 9223M and 9224M, and offset control circuits 9225M and 9226M. The signal conversion circuit 921M and the signal computing circuit 922M may simultaneously include some transistors of the de-identification offset circuits 9223M and 9224M.

In the embodiment, the de-identification sub-circuits 9213M, 9214M, 9221M, and 9222M include transistors T1M to T4M. The de-identification offset circuit 9223M may include transistors T5M, T7M, and T9M. The de-identification offset circuit 9224M may include transistors T6M, T8M, and T10M. In some embodiments, the transistors T1M, T2M, T5M, and T6M are N type transistors, and the transistors T3M, T4M, T7M, T8M, T9M, and T10M are P type transistors, but the disclosure is not limited thereto, and the design may be adjusted according to actual requirements.

Reference may be made to the content described in the embodiments of FIG. 9I to FIG. 9L for the circuit structure of the amplifier circuit 920M. More specifically, reference may be made to the signal conversion circuits 921I to 921L and the signal computing circuits 922I to 922L described in FIG. 9I to FIG. 9L for the architectures of the transistors T1M to T4M of the signal conversion circuit 921M and the signal computing circuit 922M, and similar content will not be described again. It is worth noting that the transistor T5M is connected in parallel with the transistor T1M of the de-identification sub-circuit 9211M. The transistor T6M is connected in parallel with the transistor T2M of the de-identification sub-circuit 9212M. The transistor T7M is connected in series between the transistor T1M of the de-identification sub-circuit 9213M and the transistor T3M of the de-identification sub-circuit 9221M. The transistor T8H is connected in series between the transistor T2M of the de-identification sub-circuit 9214M and the transistor T4M of the de-identification sub-circuit 9222M. The transistor T9M is connected in parallel with the transistor T3M of the de-identification sub-circuit 9221M, and the transistor T10M is connected in parallel with the transistor T4M of the de-identification sub-circuit 9222M.

In the embodiment, a first terminal of the transistor T1M is coupled to a first terminal of the transistor T5M and a second terminal of the transistor T7M. A control terminal of the transistor T1M receives a first signal 902M_1 of accumulated data. A second terminal of the transistor T1M is coupled to a second terminal of the transistor T5M and the reference current source 924M. A first terminal of the transistor T2M is coupled to a first terminal of the transistor T6M, a second terminal of the transistor T8M, and an output terminal 923M. A control terminal of the transistor T2M may receive a second signal 902M_2 of accumulated data. A second terminal of the transistor T2M is coupled to a second terminal of the transistor T6M and the reference current source 924M. Control terminals of the transistors T5M and T7M and a first terminal of the transistor T9M are coupled to the offset control circuit 9225M. Control terminals of the transistors T6M, T8M, and T10M are coupled to the offset control circuit 9226M.

A first terminal of the transistor T7M is coupled to a control terminal and a second terminal of the transistor T9M, a second terminal of the transistor T3M, a control terminal of the transistor T3M, and a control terminal of the transistor T4M. A first terminal of the transistor T8M is coupled to a second terminal of the transistor T10M and a second terminal of the transistor T4M. A first terminal of the transistor T3M is coupled to the operating voltage VDD. A first terminal of the transistor T4M is coupled to the operating voltage VDD and a first terminal of the transistor T10M.

In some embodiments, the first signal 902M_1 and the second signal 902M_2 may be voltage signals. At least one of the transistors T1M to T10M may respectively have different analog offset errors due to process errors, but the disclosure is not limited thereto. In some embodiments, the offset control circuit 9225M may also receive an obfuscated code 903M to output multiple same or different offset control signals to control the transistors T5M, T7M, and T9M, and the offset control circuit 9226M may also receive an obfuscated code 904M to output multiple same or different offset control signals to control the transistors T6M, T8M, and T10M, so that additional analog offset errors may be respectively provided.

In the embodiment, the transistor T1M is controlled via the first signal 902M_1 to determine a current signal flowing through the transistor T1M, and the transistor T5M is controlled via a corresponding offset control signal to determine a current signal flowing through the transistor T5M. In this regard, the two current signals are combined and then flow through the transistors T3M, T7M, and T9M and are converted into a conversion signal with an analog offset error. The transistor T2M is controlled via the second signal 902M_2 to determine a current signal flowing through the transistor T2M, and the transistor T6M is controlled via a corresponding offset control signal to determine a current signal flowing through the transistor T6M. In this regard, the two current signals are combined and then flow through the transistors T4M, T8M, and T10M and are converted into another conversion signal with an analog offset error. To sum up, the output terminal 923M may output a voltage signal of the conversion result with the analog offset error (that is, a result of subtracting the conversion signal from another conversion signal) to a back-end comparator (such as outputting the conversion result to the comparator 8227 of FIG. 8), so that the back-end comparator may perform an operation to generate de-identification data. More specifically, through controlling the obfuscated codes 903M and 904M to influence the transistors T5M to T10M, the output terminal 923M outputs the conversion result with a sufficient privacy level in response to the additional analog offset error. In other words, in the disclosure, an adjustable analog offset error may be generated through controlling the obfuscated codes 903M and 904M to further control the output terminal 923M to output the conversion result with the sufficient privacy level.

In addition, it should be noted that the configuration number and the configuration position of the transistors of the de-identification offset circuits in the embodiments of FIG. 9A to FIG. 9M are not limited to as shown in the drawings. In some embodiments of the disclosure, the transistors of the de-identification offset circuits of the embodiments of FIG. 9A to FIG. 9M may also have different configuration numbers and/or different configuration positions according to the same or similar design concepts of the context. In addition, it should be noted that in some embodiments, at least one of the offset control circuits 9225C, 9225D, 9225F to 9225M, 9226C, 9226D, and 9226F to 9226M of FIG. 9C to FIG. 9M (wherein the offset control circuit of FIG. 9E is not shown) may also be preset to output one or more fixed offset control signals to control the corresponding transistors to generate the additional analog offset errors without receiving the externally input obfuscated codes.

Figure 10:
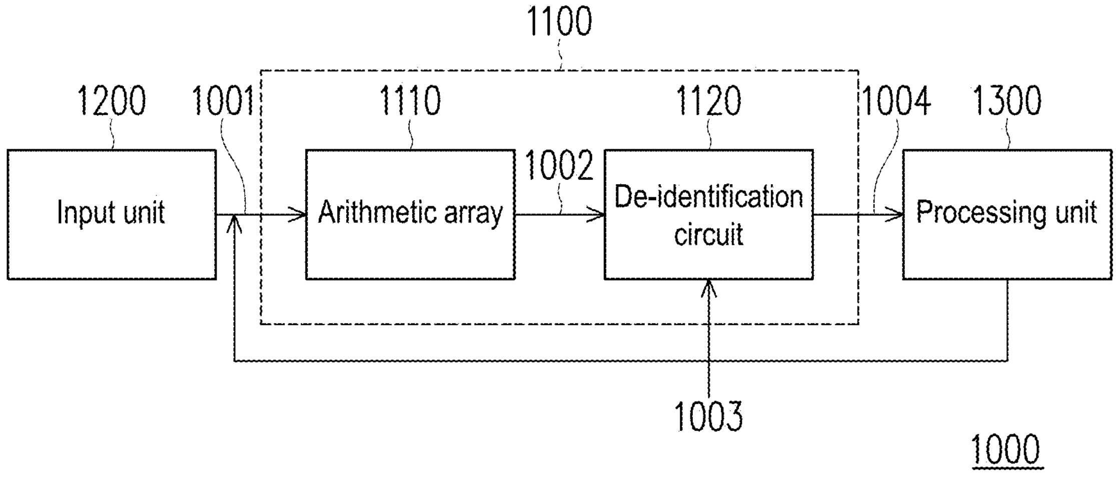
FIG. 10 is a schematic diagram of a data computing system according to an embodiment of the disclosure.

FIG. 10 is a schematic diagram of a data computing system 1000 according to an embodiment of the disclosure. Please refer to FIG. 10. The data computing system 1000 includes a computing circuit 1100 with a de-identified architecture, an input unit 1200, and a processing unit 1300. The computing circuit 1100 is coupled to the input unit 1200 and the processing unit 1300. The computing circuit 1100 includes an arithmetic array 1110 and a de-identification circuit 1120. In the embodiment, the arithmetic array 1110 may receive input data 1001 provided by the input unit 1200, and perform computation in memory on the input data 1001 to generate accumulated data 1002.

In the embodiment, the de-identification circuit 1120 may receive an obfuscated code 1003. The de-identification circuit 1120 may operate the accumulated data 1002 according to an analog offset error, perform de-identification processing on the accumulated data 1002 to generate de-identification data 1004, and then output the de-identification data 1004 to the processing unit 1300. More specifically, regarding the circuit architectures, implementations, and technical details of the arithmetic array 1110 and the de-identification circuit 1120, reference may be made to the descriptions of the embodiments of FIG. 1 to FIG. 9M to obtain sufficient teachings, suggestions, and implementation illustrations, so no further description will be given.

In an embodiment, the input unit 1200 may be a sensor, a camera, a microphone, a data storage unit, or a related electronic apparatus that may be used as a data source. In an embodiment, the processing unit 1300 may be a processor, a controller, or a related circuit with a data processing function. In another embodiment, the processing unit 1300 may also be a cloud server, but the disclosure is not limited thereto. In some embodiments, the computing circuit 1100, the input unit 1200, and the processing unit 1300 may be integrated into the same electronic device or sensor. In another embodiment, the processing unit 1300 may be integrated into the cloud server, and the computing circuit 1100 may transmit the de-identification data 1004 to the processing unit 1300 through wired or wireless communication. In another embodiment, the computing circuit 1100 and the input unit 1200 may be integrated into the cloud server, and the computing circuit 1100 may transmit the de-identification data 1004 to the processing unit 1300 through wired or wireless communication. In another embodiment, the computing circuit 1100 and the input unit 1300 may be integrated into the cloud server, and the input unit 1200 may transmit the input data 1001 to the computing circuit 1100 through wired or wireless communication, and the computing circuit 1100 in the cloud server then performs a de-identification action.

For example, the computing circuit 1100, the input unit 1200, and the processing unit 1300 may be integrated into the same image sensor. After the image sensor obtains image data, the image sensor may perform de-identification data processing on the image data in real time to directly output de-identified image data to the cloud server or other back-end electronic apparatuses. Alternatively, for another example, the input unit 1200 may be an image capture apparatus (for example, a camera), and the computing circuit 1100 and the processing unit 1300 may be integrated into the cloud server. The input unit 1200 may obtain the image data and provide the image data to the cloud server, so that the cloud server may perform de-identification processing on the image data through the computing circuit 1100 to generate the de-identified image data for subsequent data use of the de-identified image data.

Figure 11:
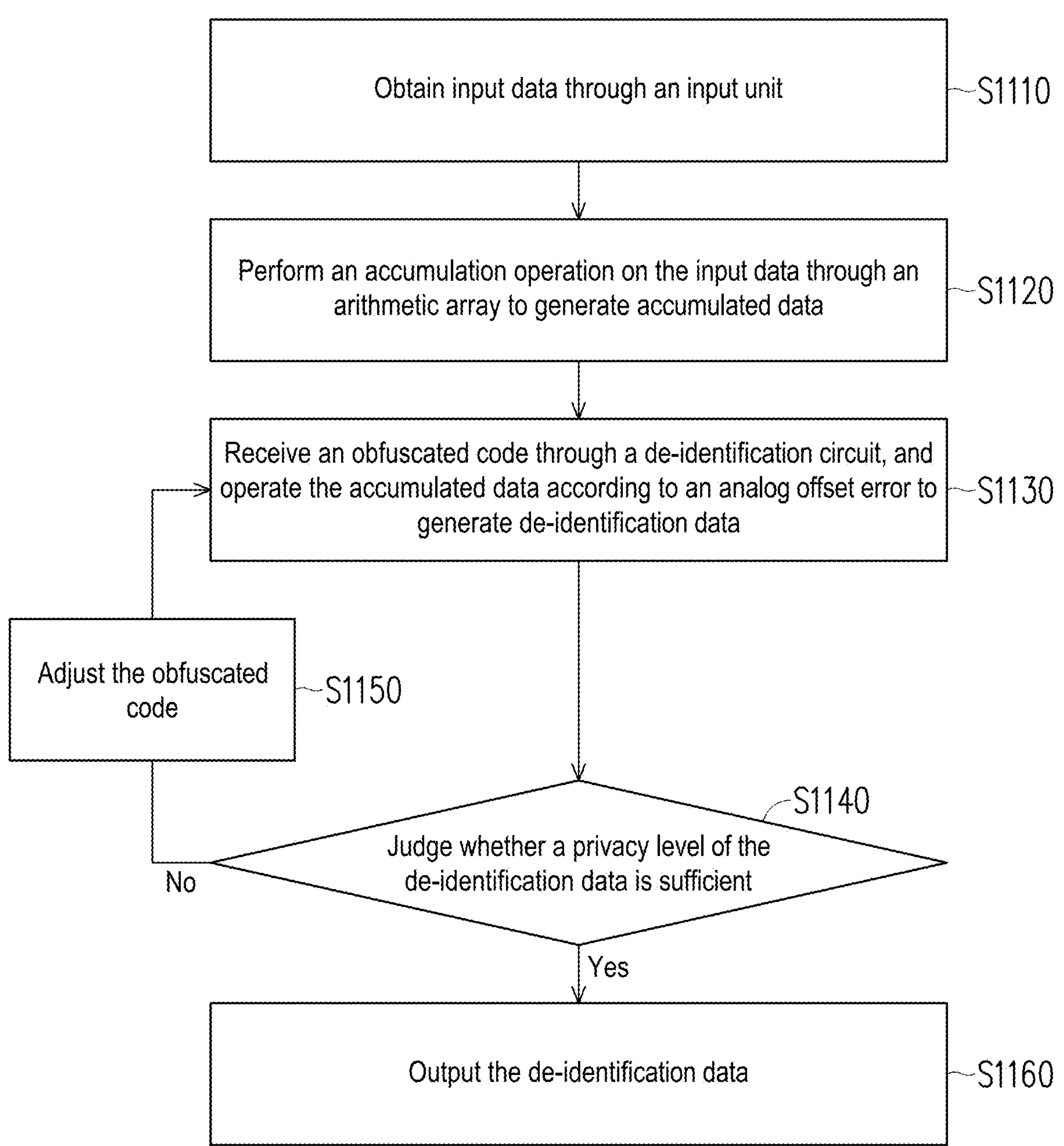
FIG. 11 is a flowchart of a data de-identification method according to an embodiment of the disclosure.

FIG. 11 is a flowchart of a data de-identification method according to an embodiment of the disclosure. Please refer to FIG. 10 and FIG. 11 at the same time. The data computing system 1000 may execute steps S1110 to S1160 below. In step S1110, the computing circuit 1100 may obtain the input data 1001 through the input unit 1200. In step S1120, the computing circuit 1100 may perform an accumulation operation on the input data 1001 through the arithmetic array 1110 to generate the accumulated data 1002. In step S1130, the computing circuit 1100 may receive the obfuscated code 1003 through the de-identification circuit 1120, and may operate the accumulated data 1002 according to the analog offset error. The de-identification circuit 1120 may perform de-identification processing on the accumulated data 1002 to generate the de-identification data 1004. In the embodiment, the analog offset error may be provided by an amplifier circuit of the de-identification circuit 1120 and also includes an additional analog offset error generated by the obfuscated code. Then, the computing circuit 1100 outputs the de-identification data 1004 to the processing unit 1300.

In step S1140, the processing unit 1300 may judge whether a privacy level of the de-identification data 1004 is sufficient. When the processing unit 1300 judges that the privacy level of the de-identification data 1004 is sufficient, step S1160 is proceeded, and the processing unit 1300 directly outputs the de-identification data 1004. On the contrary, when the processing unit 1300 judges that the privacy level of the de-identification data 1004 is insufficient, step S1150 is proceeded, and the processing unit 1300 may adjust the obfuscated code 1003 which input to the de-identification circuit 1120, and then return to step S1130. The arithmetic circuit 1100 can once again receive the obfuscation code 1003 through the de-identification circuit 1120 and compute the accumulated data 1002 based on the analog offset error caused by the obfuscation code 1003. The de-identification circuit 1120 could reprocess the accumulated data 1002 for de-identification generating the de-identified data 1004 again, in order to improve the degree of de-identification. In addition, in another embodiment, the de-identification circuit 1120 may not receive the obfuscated code 1003 or use a fixed obfuscated code to provide a fixed analog offset error. To sum up, the data computing system 1000 of the embodiment can automatically and effectively perform de-identification processing on data.

In the embodiment, the processing unit 1300 may perform an error calculation on the de-identification data 1004 to generate an error parameter, wherein the error parameter may be derived and described through Formulas (1) to (4) below, where $$a^{V}_{(x,y)}$$

is the value after error verification, $$a^{Vsa}_{(x,y)}$$

represents the influence generated due to a process error of at least one transistor in the de-identification circuit 1120, $$a^{Vcell}_{(x,y)}$$

represents the influence generated due to offset control corresponding to at least one transistor in the de-identification circuit 1120, SAm represents a Gaussian distribution of the influence generated due to the process error of at least one transistor in the de-identification circuit 1120, wherein the mean is 0 and the variation is 0.03 as an example, and CV represents a Gaussian distribution of the influence generated due to offset control corresponding to at least one transistor in the de-identification circuit 1120, wherein the mean is 0 and the variation is 0.3 as an example. The error parameter is N(0, 0.3571).

$$a^{V}_{(x,y)} = a^{Vsa^{Vcell}}_{(x,y)_{(X,Y)}} \quad \text{Formula (1)}$$

$$SAm = a_{(x,y)} * [1 + N(0, 0.03)] \quad \text{Formula (2)}$$

$$CV = a_{(x,y)} * [1 + N(0, 0.3)] \quad \text{Formula (3)}$$

$$a^{V}_{(x,y)} = a_{(x,y)} + N(0, 0.3571) \quad \text{Formula (4)}$$

In the embodiment, the processing unit 1300 may perform an inverse transformation operation of the Gaussian distribution such as Formula (5) below on the error parameter N(0, 0.3571) to generate the privacy level. Taking the error parameter as N(0, 0.3571) as an example, the processing unit 1300 may calculate to obtain that the privacy level is ε=7.5, wherein the variation δ is $10^{-5}$(δ=$10^{-5}$), and the variable s is $$\frac{2}{\sqrt{2}}.$$

It should be noted that the privacy level is negatively correlated with the degree of data protection, that is, the higher the privacy level, the worse the level of data protection, and vice versa.

$$0.3571 = \sigma^2 = \left(\frac{2 \cdot s^2 \cdot \log\left(\frac{1.25}{\delta}\right)}{\varepsilon^2}\right)^2 \quad \text{Formula (5)}$$

Figure 12:
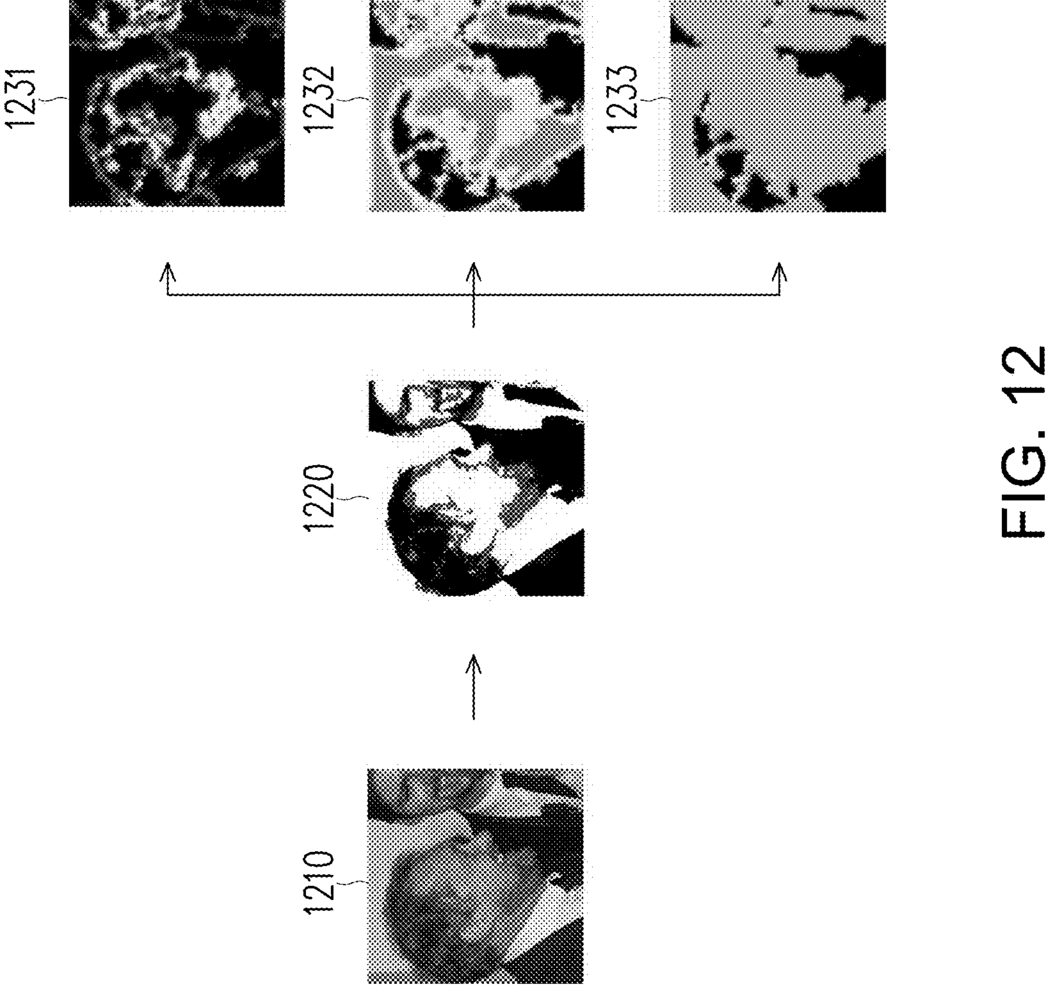
FIG. 12 is a schematic diagram of input data and de-identification data according to an embodiment of the disclosure.

FIG. 12 is a schematic diagram of input data and de-identification data according to an embodiment of the disclosure. Please refer to FIG. 10 and FIG. 12. The input unit 1200 may obtain image data 1210, and first perform binary processing on the image data 1210 to generate input data 1220. In some embodiments, the input unit 1200 may provide the input data 1220 to the computing circuit 1100, and the computing circuit 1100 may perform a convolutional neural network (CNN) operation on the input data 1220, but the disclosure is not limited thereto.

As shown in FIG. 12, in the case where the obfuscated code is not used to generate the additional analog offset error (the obfuscated code at this time may be regarded as 0), the computing circuit 1100 may perform a de-identification operation on a result (that is, feature data or a feature map) of the input data 1220 after the convolutional neural network operation according to the analog offset error generated by the process error of at least one transistor in the de-identification circuit 1120 during the process of performing the convolutional neural network operation to generate de-identification data 1231. Accordingly, the de-identification data 1231 may have fewer image features than the image data 1210 and the input data 1220, which can reduce identifiability.

Correspondingly, in the case where the obfuscated code is used to generate the additional analog offset error, the computing circuit 1100 may perform the de-identification operation on the result (that is, the feature data or the feature map) of the input data 1220 after the convolutional neural network operation according to the process error of at least one transistor and an analog offset error generated by at least one other transistor after error offset control in the de-identification circuit 1120 during the process of performing the convolutional neural network operation to generate de-identification data 1232. Accordingly, the de-identification data 1232 may have fewer image features than the image data 1210, the input data 1220, and the de-identification data 1231, which can reduce the degree of identifiability to be lower than that of the de-identification data 1231. For example, the privacy level of the de-identification data 1232 may be ε=7.5.

At the same time, if the privacy level is to be increased, the degree of de-identification (that is, the degree of image blur) may be increased through adjusting the obfuscated code input to the de-identification circuit 1120. As shown in FIG. 12, the computing circuit 1100 may perform the de-identification operation on the result of the input data 1220 after the convolutional neural network operation in conjunction with the setting of the obfuscated code to generate de-identification data 1233. Accordingly, the de-identification data 1233 may have fewer image features than the image data 1210, the input data 1220, and the de-identification data 1231 and 1232, which can reduce the degree of identifiability to be lower than those of the de-identification data 1231 and 1232. For example, the privacy level of the de-identification data 1233 may be ε=4.4. In other words, the data computing system 1000 of the embodiment can implement the optimal data de-identification function and can also provide the function of dynamically adjusting the privacy level.

In summary, the computing circuit with the de-identified architecture, the data computing method, the data processing system, and the data de-identification method of the disclosure may effectively perform de-identification processing on data through the analog offset error generated by the circuit element manufacturing process. Furthermore, the additional analog offset error may be provided through the de-identification offset circuit to increase the degree of de-identification of data.

What is claimed is:

1. A computing circuit with a de-identified architecture, comprising:

an arithmetic array, performing an accumulation operation on input data to generate accumulated data; and a de-identification circuit, coupled to the arithmetic array and having an analog offset error determined based on an analog physical unclonable function, wherein the de-identification circuit operates the accumulated data according to the analog offset error to generate de-identification data.

2. The computing circuit according to claim 1, wherein the arithmetic array comprises a plurality of computing in memory units, and the computing in memory units are used to receive the input data and perform computation in memory.

3. The computing circuit according to claim 1, wherein the de-identification circuit comprises:

an amplifier circuit, coupled to the arithmetic array, and the amplifier circuit comprising at least one transistor, wherein the analog offset error comprises at least one error coefficient provided by the at least one transistor.

4. The computing circuit according to claim 3, wherein the amplifier circuit comprises:

a signal conversion circuit, coupled to the arithmetic array and comprising a first signal conversion unit and a second signal conversion unit, wherein the first signal conversion unit has a first de-identification sub-circuit and is coupled to the arithmetic array through a first input terminal of the amplifier circuit, and the second signal conversion unit has a second identification sub-circuit and is coupled to the arithmetic array through a second input terminal of the amplifier circuit; and a signal computing circuit, comprising a third de-identification sub-circuit, a fourth de-identification sub-circuit, and a comparator, wherein the third de-identification sub-circuit is coupled to the signal conversion circuit and the comparator, and the fourth de-identification sub-circuit is coupled to the signal conversion circuit and the comparator.

5. The computing circuit according to claim 4, wherein the first de-identification sub-circuit receives a first signal of the accumulated data, and outputs a first conversion signal to the third de-identification sub-circuit, the second de-identification sub-circuit receives a second signal of the accumulated data, and outputs a second conversion signal to the fourth de-identification sub-circuit, the third de-identification sub-circuit and the fourth de-identification sub-circuit output a conversion result to the comparator according to the first conversion signal and the second conversion signal, so that the comparator generates the de-identification data according to the conversion result.

6. The computing circuit according to claim 5, wherein the first de-identification sub-circuit comprises a first transistor, the second de-identification sub-circuit comprises a second transistor, the third de-identification sub-circuit comprises a third transistor, and the fourth de-identification sub-circuit comprises a fourth transistor, a first terminal of the first transistor is coupled to the third transistor, a second terminal or a control terminal of the first transistor receives the first signal, a first terminal of the second transistor is coupled to the fourth transistor, and a second terminal or a control terminal of the second transistor receives the second signal, a first terminal of the third transistor is coupled to an operating voltage, a second terminal of the third transistor is coupled to the first terminal of the first transistor, and a first terminal of the fourth transistor is coupled to the operating voltage, and a second terminal of the fourth transistor is coupled to the first terminal of the second transistor.

7. The computing circuit according to claim 6, wherein the control terminal of the first transistor receives a first clamping voltage, and the second terminal of the first transistor receives the first signal, the control terminal of the second transistor receives a second clamping voltage, and the second terminal of the second transistor receives the second signal, a control terminal of the third transistor is coupled to the second terminal of the third transistor, and a control terminal of the fourth transistor is coupled to the second terminal of the fourth transistor.

8. The computing circuit according to claim 6, wherein the control terminal of the first transistor receives a first clamping voltage, and the second terminal of the first transistor receives the first signal, the control terminal of the second transistor receives a second clamping voltage, and the second terminal of the second transistor receives the second signal, and a control terminal of the third transistor is coupled to the second terminal of the third transistor and a control terminal of the fourth transistor.

9. The computing circuit according to claim 6, wherein the control terminal of the first transistor receives a first signal, and the second terminal of the first transistor is coupled to a reference current source, the control terminal of the second transistor receives the second signal, and the second terminal of the second transistor is coupled to the reference current source, and a control terminal of the third transistor is coupled to the second terminal of the third transistor and a control terminal of the fourth transistor.

10. The computing circuit according to claim 6, wherein the first transistor and the second transistor are N type transistors, and the third transistor and the fourth transistor are P type transistors.

11. The computing circuit according to claim 4, wherein at least one of the signal conversion circuit and the signal computing circuit further comprises a de-identification offset circuit, and the de-identification offset circuit comprises at least one fifth transistor, and the analog offset error comprises at least one other error coefficient provided by the at least one fifth transistor.

12. The computing circuit according to claim 11, wherein the de-identification offset circuit is connected in series between the first de-identification sub-circuit and the third de-identification sub-circuit, and the de-identification offset circuit is connected in series between the second de-identification sub-circuit and the fourth de-identification sub-circuit.

13. The computing circuit according to claim 11, wherein the de-identification offset circuit is connected in parallel with the first de-identification sub-circuit, and the de-identification offset circuit is connected in parallel with the second de-identification sub-circuit.

14. The computing circuit according to claim 11, wherein the de-identification offset circuit is connected in parallel with the third de-identification sub-circuit, and the de-identification offset circuit is connected in parallel with the fourth de-identification sub-circuit.

15. The computing circuit according to claim 11, wherein the de-identification offset circuit comprises a plurality of fifth transistors, and the fifth transistors are connected in parallel.

16. The computing circuit according to claim 11, wherein the de-identification offset circuit comprises a plurality of fifth transistors, and the fifth transistors are connected in series.

17. The computing circuit according to claim 11, wherein the signal computing circuit further comprises an offset control circuit, and the offset control circuit is coupled to the at least one fifth transistor, the offset control circuit outputs at least one offset control signal to the at least one fifth transistor to determine the at least one other error coefficient.

18. The computing circuit according to claim 17, wherein the offset control circuit receives an obfuscated code, and the offset control circuit determines the at least one offset control signal according to the obfuscated code.

19. The computing circuit according to claim 18, wherein the analog offset error comprises an additional analog offset error generated by the obfuscated code.

20. The computing circuit according to claim 1, wherein the de-identification circuit receives an obfuscated code, and the de-identification circuit generates an additional analog offset error according to the obfuscated code.

21. A de-identification data computing method, comprising:

performing an accumulation operation on input data through an arithmetic array to generate accumulated data; and operating the accumulated data according to an analog offset error through a de-identification circuit to generate de-identification data, wherein the analog offset error is determined based on an analog physical unclonable function of the de-identification circuit.

22. The data computing method according to claim 21, wherein the step for generating the de-identification data comprises:

operating the accumulated data according to the analog offset error and at least one obfuscated code through the de-identification circuit to generate the de-identification data.

* * * * *